United States Patent
Koyama et al.

(10) Patent No.: US 10,944,955 B2
(45) Date of Patent: Mar. 9, 2021

(54) MULTIPLE VIEWPOINT IMAGE CAPTURING SYSTEM, THREE-DIMENSIONAL SPACE RECONSTRUCTING SYSTEM, AND THREE-DIMENSIONAL SPACE RECOGNITION SYSTEM

(71) Applicant: Panasonic Intellectual Property Management Co., Ltd., Osaka (JP)

(72) Inventors: Tatsuya Koyama, Kyoto (JP); Toshiyasu Sugio, Osaka (JP); Toru Matsunobu, Osaka (JP); Satoshi Yoshikawa, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/284,339

(22) Filed: Feb. 25, 2019

(65) Prior Publication Data
US 2019/0191146 A1    Jun. 20, 2019

Related U.S. Application Data

(63) Continuation of application No. PCT/JP2017/030029, filed on Aug. 23, 2017.

(30) Foreign Application Priority Data

Sep. 1, 2016 (JP) .............................. JP2016-171328

(51) Int. Cl.
*H04N 13/246* (2018.01)
*H04N 5/222* (2006.01)
(Continued)

(52) U.S. Cl.
CPC ....... *H04N 13/246* (2018.05); *G06K 9/00744* (2013.01); *G06T 7/20* (2013.01);
(Continued)

(58) Field of Classification Search
CPC .. H04N 13/246; H04N 13/296; H04N 13/243; H04N 13/111; H04N 5/222;
(Continued)

(56) References Cited

U.S. PATENT DOCUMENTS

2009/0315978 A1* 12/2009 Wurmlin ................ G06T 5/005
348/43
2014/0267618 A1*  9/2014 Esteban .................. G06T 5/003
348/46
(Continued)

FOREIGN PATENT DOCUMENTS

JP       2015-22510       2/2015

OTHER PUBLICATIONS

International Search Report dated Oct. 3, 2017 in International (PCT) Application No. PCT/JP2017/030029.
(Continued)

*Primary Examiner* — Joseph G Ustaris
*Assistant Examiner* — Matthew David Kim
(74) *Attorney, Agent, or Firm* — Wenderoth, Lind & Ponack, L.L.P.

(57) ABSTRACT

A multiple viewpoint image capturing system includes: a plurality of cameras that capture videos in a predetermined space from different positions; a circumstance sensing unit that senses at least one of circumstances of the respective cameras and circumstances of the predetermined space, and outputs the sensed circumstances in a form of capturing circumstance information; and an event detector that detects a predetermined event based on the capturing circumstance information, determines whether to perform camera calibra-
(Continued)

tion in a case of detecting the predetermined event, and outputs camera calibration information that indicates the camera calibration to be performed in a case of determining that the camera calibration is to be performed.

22 Claims, 10 Drawing Sheets

(51) Int. Cl.
    *H04N 5/232*     (2006.01)
    *H04N 7/18*     (2006.01)
    *H04N 21/218*     (2011.01)
    *G06T 7/80*     (2017.01)
    *G06T 7/70*     (2017.01)
    *H04N 13/296*     (2018.01)
    *H04N 13/243*     (2018.01)
    *H04N 13/111*     (2018.01)
    *G06K 9/00*     (2006.01)
    *G06T 7/20*     (2017.01)

(52) U.S. Cl.
    CPC .................. *G06T 7/70* (2017.01); *G06T 7/80* (2017.01); *H04N 5/222* (2013.01); *H04N 5/232* (2013.01); *H04N 5/23212* (2013.01); *H04N 7/18* (2013.01); *H04N 7/181* (2013.01); *H04N 13/111* (2018.05); *H04N 13/243* (2018.05); *H04N 13/296* (2018.05); *H04N 21/21805* (2013.01); *G06K 2009/00738* (2013.01); *G06T 2207/10016* (2013.01); *G06T 2207/30244* (2013.01); *H04N 5/23206* (2013.01)

(58) Field of Classification Search
    CPC .......... H04N 5/232; H04N 7/18; H04N 7/181; H04N 21/21805; G06T 7/80; G06T 7/70; G06T 7/20; G06K 9/00744
    USPC ........................................................... 348/48
    See application file for complete search history.

(56) References Cited

U.S. PATENT DOCUMENTS

| | | |
|---|---|---|
| 2014/0320667 A1 | 10/2014 | Densham et al. |
| 2016/0212418 A1 | 7/2016 | Demirdjian et al. |
| 2017/0034502 A1* | 2/2017 | Aurongzeb ............... G06T 7/80 |
| 2017/0104979 A1* | 4/2017 | Shaw .................... G06F 3/0346 |
| 2017/0127008 A1* | 5/2017 | Kankaanpaa ...... G06K 9/00711 |

OTHER PUBLICATIONS

Sun Shih-Wei et al., "People tracking in an environment with multiple depth cameras: A skeleton-based pairwise trajectory matching scheme", Journal of Visual Communication and Image Representation, Academic Press, Inc, US, vol. 35, Dec. 2, 2015, pp. 36-54.
Extended European Search Report dated Jul. 19, 2019 in corresponding European Patent Application No. 17846230.5.
Office Action dated May 14, 2020 in European Patent Application No. 17 846 230.5.

* cited by examiner

FIG 4A

| NO. | TIME | CALIBRATION TARGET | REASON |
|---|---|---|---|
| 0021 | 19:25:30 | 10A | 20: CAMERA PLATFORM ROTATED OR MOVED |

FIG. 4B

| NO. | TIME | CALIBRATION TARGET | REASON |
|---|---|---|---|
| 0045 | 20:02:05 | All | 100: HALFTIME DETECTED |

FIG. 7
| NO. | ADJUSTMENT TARGET | ADJUSTMENT DETAILS |
|---|---|---|
| 0020 | 11A | HORIZONTAL: 15° RIGHTWARD, VERTICAL: 2° DOWNWARD, HEIGHT: 0 cm |
FIG. 8
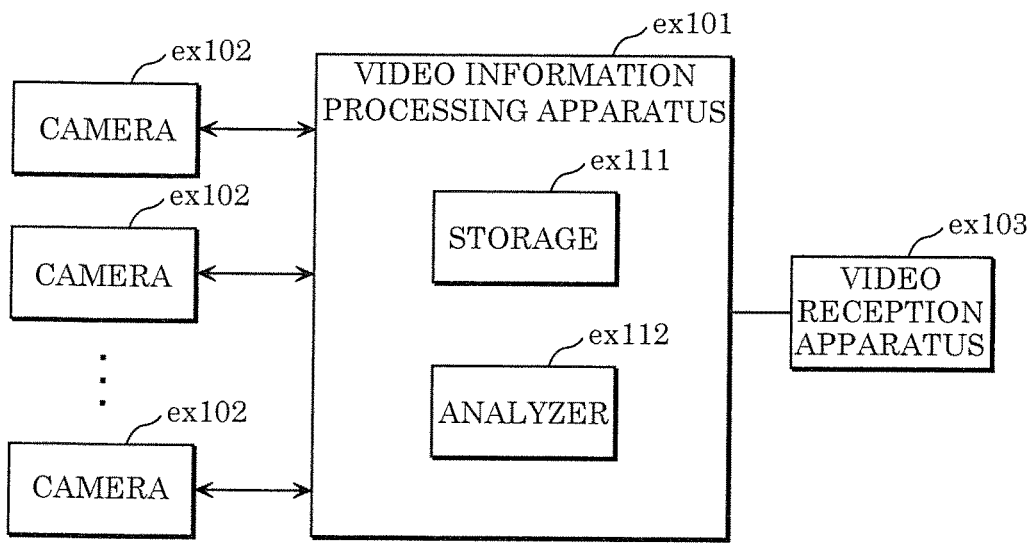
FIG. 9
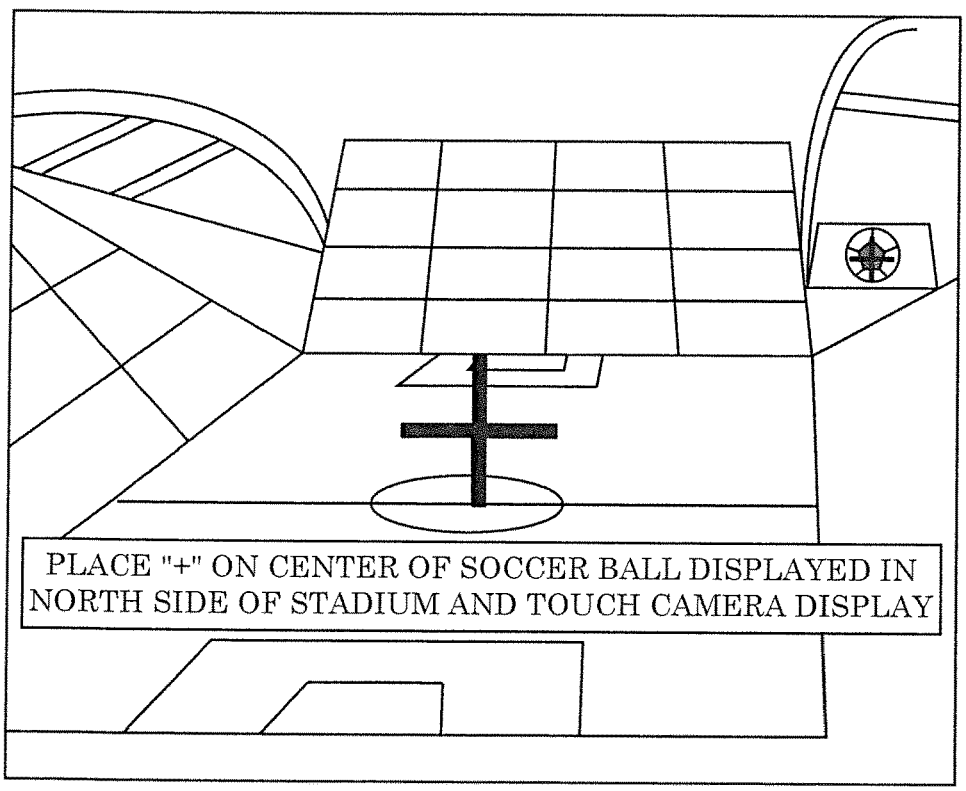

MULTIPLE VIEWPOINT IMAGE CAPTURING SYSTEM, THREE-DIMENSIONAL SPACE RECONSTRUCTING SYSTEM, AND THREE-DIMENSIONAL SPACE RECOGNITION SYSTEM

CROSS REFERENCE TO RELATED APPLICATIONS

This application is a U.S. continuation application of PCT International Patent Application Number PCT/JP2017/030029 filed on Aug. 23, 2017, claiming the benefit of priority of Japanese Patent Application Number 2016-171328 filed on Sep. 1, 2016, the entire contents of which are hereby incorporated by reference.

BACKGROUND

1. Technical Field

The present disclosure relates to a technique for calibrating a plurality of cameras that capture videos used for three-dimensional space reconstruction.

2. Description of the Related Art

A technique for reproducing a three-dimensional shape of a subject from videos captured by a plurality of cameras is disclosed in Japanese Unexamined Patent Application Publication No. 2015-022510. According to Japanese Unexamined Patent Application Publication No. 2015-022510, the three-dimensional shape is used to generate a free-viewpoint video.

SUMMARY

There is a demand for a multiple viewpoint image capturing system that provides three-dimensional space reconstruction and three-dimensional space recognition that are more stable in accuracy and availability. The present disclosure provides a multiple viewpoint image capturing system that increases stability of accuracy and availability of three-dimensional space reconstruction and three-dimensional space recognition by calibrating a plurality of cameras at an appropriate time during performing the three-dimensional space reconstruction.

A multiple viewpoint image capturing system according to the present disclosure includes: a plurality of cameras that capture videos in a predetermined space from different positions; a circumstance sensing unit that senses at least one of circumstances of the respective cameras and circumstances of the predetermined space, and outputs the circumstances sensed, in a form of capturing circumstance information; and an event detector that detects occurrence of a predetermined event based on the capturing circumstance information, determines whether to perform camera calibration in a case of detecting the occurrence of the predetermined event, and outputs camera calibration information that indicates the camera calibration to be performed in a case of determining that the camera calibration is to be performed.

The multiple viewpoint image capturing system according to the present disclosure increases stability of accuracy and availability of three-dimensional space reconstruction and three-dimensional space recognition by calibrating a plurality of cameras at an appropriate time during performing the three-dimensional space reconstruction.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4A is a diagram illustrating an example of a data configuration of camera calibration information in Embodiment 1;

FIG. 4B is a diagram illustrating another example of the data configuration of the camera calibration information in Embodiment 1;

FIG. 7 is a diagram illustrating another example of a data configuration of camera adjustment information in Embodiment 2;

FIG. 8 is a diagram illustrating a configuration of a video information processing system;

FIG. 9 is a diagram illustrating an example of a notification screen displayed when a camera starts;

Figure 1:
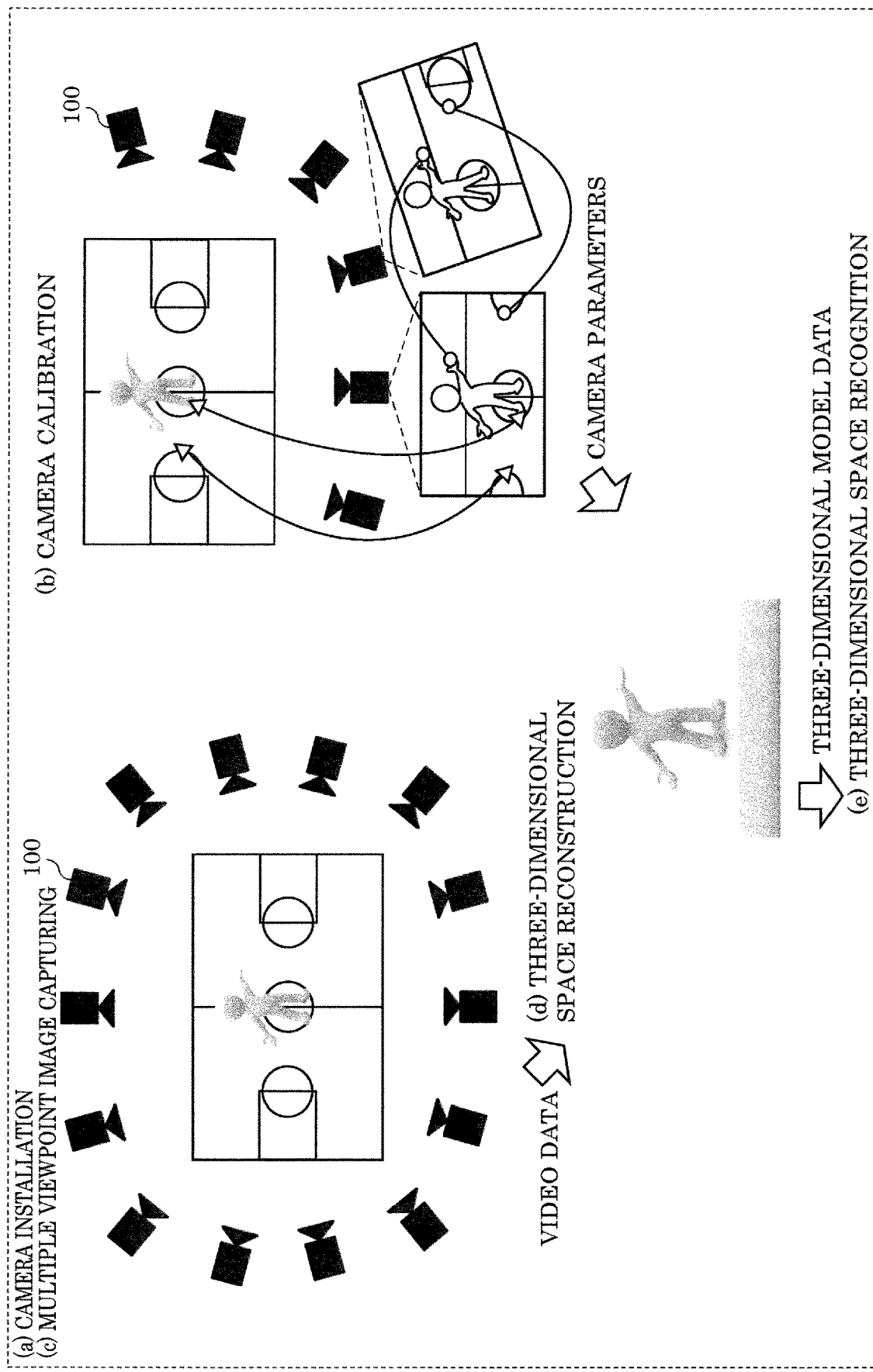
FIG. 1 is a diagram illustrating an outline of three-dimensional space recognition.

DETAILED DESCRIPTION OF THE EMBODIMENTS (Underlying Knowledge Forming Basis of Present Disclosure)

Generation of a free-viewpoint video in a three-dimensional shape uses a result of three-dimensional space reconstruction performed by a three-dimensional space reconstructing device that reconstructs (models) a three-dimensional shape of a subject. The three-dimensional space reconstructing device performs the modeling using video data that is provided from a multiple viewpoint image capturing system including a plurality of cameras to capture videos of the same scene and using camera parameters that represent positions and attitudes of the cameras obtained by the calibration. Accordingly, if a position or the like of a camera changes after the calibration, the three-dimensional space reconstruction cannot be performed appropriately because the camera parameters no longer reflect an actual state of the positions and the like of the cameras, resulting in deterioration in a quality of the free-viewpoint video or failure in generating the free-viewpoint video itself. A conceivable method is thus one in which the three-dimensional space reconstruction is appropriately performed by fixing the cameras during the calibration and the capturing so as not to change a position or the like of a camera after the calibration. Such a method however can be used only in limited environments because in some installation environments of the cameras, vibrations, winds, or the like occurring in a camera installation location may change a position or the like of a camera.

A result of the three-dimensional space reconstruction is used not only in the generation of a free-viewpoint video but also a next-generation monitoring system that includes functions of scene analysis in a three-dimensional space, tracking a particular subject, and the like. If the three-dimensional space reconstruction is not performed appropriately, these functions cannot be performed with accuracy, either.

The functions of generating a free-viewpoint video, scene analysis, tracking a subject in a three-dimensional space (hereafter, these functions will be collectively referred to as three-dimensional space recognition) are performed with accuracy when camera parameters of cameras included in a multiple viewpoint image capturing system reflect an actual state of the cameras. In view of this, the inventors have considered that when there are changes in positions or the like of cameras, it is preferable to calibrate the cameras after the changes. In addition, the inventors also have considered that it is preferable to suppress an extent and a duration of influence of calibrating the cameras (hereafter, also referred to as camera calibration) on the three-dimensional space reconstruction.

Hereinafter, embodiments will be described in detail with reference to the drawings as appropriate. Detailed descriptions more than necessary will however be omitted in some cases. For example, detailed description of a subject that has been well known or repeated description of the substantially same configuration will be omitted in some cases. This is to avoid making the following description unnecessarily redundant so as to help those skilled in the art understand the description.

Note that the inventors merely provide the accompanying drawings and the following description to allow those skilled in the art to understand the present disclosure sufficiently, and the accompanying drawings and the following description are not intended to limit subject matters described in the claims.

Embodiment 1

Hereafter, Embodiment 1 will be described with reference to FIG. 1 to FIG. 4B.

[1. Outline of Three-Dimensional Space Recognition]

First, an outline of three-dimensional space recognition in which a multiple viewpoint image capturing system according to the present embodiment is used will be described with reference to FIG. 1.

The multiple viewpoint image capturing system includes a plurality of cameras to capture the same scene in a predetermined space. A specific example of the predetermined space is a venue where a sporting event is held, and a specific example of the same scene is a scene of a match held in the venue. As another example, the predetermined space is one that is monitored by monitoring cameras, and the same scene is, for example, what is going on with a person or an object present in the space being monitored.

The plurality of cameras capture videos of areas that at least overlap one another in the space, from positions different from one another. For example, as illustrated in (a) of FIG. 1, a plurality of cameras 100 surround a space that is a venue of a sport match and are installed at positions that are different from one another. The plurality of cameras 100 take attitudes that are different from one another, so that capturing areas of cameras 100 each include at least a part of the space. The capturing areas of cameras 100 are made to at least overlap one another because virtual reconstruction of a three-dimensional space (the three-dimensional space reconstruction) uses video data that are generated by capturing the same subject from a plurality of viewpoints.

Making the capturing areas overlap one another does not involve a capturing area of one camera 100 overlapping capturing areas of the other cameras 100; the capturing area may overlap capturing areas of some of the other cameras 100.

The plurality of cameras 100 installed in such a manner are communicatively connected to a control device to be described later included in the multiple viewpoint image capturing system.

When cameras 100 are installed, the camera calibration is performed.

The camera calibration is to calculate parameters that indicate a position and an angle of a capturing direction (attitude) of each camera 100 by establishing a correspondence between an actual point in a capturing area of each camera 100 and a point in a video (correspondence between points illustrated by white triangles connected by curves in (b) of FIG. 1) or by associating points in videos of different cameras 100 (correspondence between points illustrated by white circles connected by curves in (b)). Parameters that indicate a position and an attitude of camera 100 are represented in a common coordinate system in a given space being a three-dimensional space and are camera parameters that are thereafter used in the three-dimensional space reconstruction. The camera parameters will be described later.

Calculating the camera parameters to make them known is preparation for performing the three-dimensional space recognition and is performed before start of the three-dimensional space recognition. The calculated camera parameters are transmitted to a three-dimensional space reconstructing device described later that performs three-dimensional space reconstruction.

After such preparation, cameras 100 performs multiple viewpoint image capturing by capturing synchronized videos based on signals from the control device ((c) of FIG. 1). Video data generated by the capturing is transmitted to the three-dimensional space reconstructing device.

In the three-dimensional space reconstruction performed by the three-dimensional space reconstructing device, the above video data and the camera parameters are used to generate three-dimensional model data on each subject in the capturing areas ((d) of FIG. 1). The three-dimensional model data is transmitted to the three-dimensional space recognition device described later that performs the three-dimensional space recognition.

Examples of the functions provided by the three-dimensional space recognition that the three-dimensional space recognition device performs using the three-dimensional model data ((e) of FIG. 1) include the above-described generation of a free-viewpoint video, scene analysis, and tracking.

A simple method for generating the free-viewpoint video will be described. First, a structure of each subject seen in a capturing area from a virtual viewpoint that is designated by a user or a system administrator or set automatically, and a distance between the viewpoint and the subject, are calculated based on the three-dimensional model data. Next, information on color and texture of each subject is acquired preferentially from video data captured by camera 100 that is closer to the virtual viewpoint than any other camera 100. Finally, the information on the color and texture and the calculated structure and distance of each subject are used to generate (render) a video that is seen from the virtual viewpoint. The rendered video is distributed to a video display terminal of the user.

Such a function of generating a free-viewpoint video is available in a field of entertainment, such as a sports program on television. This allows, for example, a viewer to play a video of a highlighted scene from a viewpoint requested by the viewer. The function of generating a free-viewpoint video may be used in the monitoring system. In this case, it is possible to provide a security guard with an estimated appearance of a suspicious person viewed from a viewpoint that is not captured by actual cameras, and to make the security guard to keep a lookout for the person.

It is also possible in the scene analysis and the tracking to calculate a structure of each subject seen in a capturing area from a virtual viewpoint and a distance between the subject and the virtual viewpoint based on the three-dimensional model data, as in the generation of free-viewpoint video, and to use information on color and texture of the subject that is acquired preferentially from camera 100 that is closer to the virtual viewpoint than any other camera 100.

The scene analysis is performed by analyzing a video showing what is going on at some instant with each subject such as a person or an object in a capturing area, by using software or by a human watching the video on a screen. By performing the scene analysis based on three-dimensional model data, it is possible to observe a three-dimensional attitude of a person in a capturing area or a three-dimensional shape of an object in a capturing area, which can make situation recognition and prediction more accurate than using only two-dimensional videos.

In the tracking, for example, some subject in a capturing area is identified by scene analysis performed on videos captured by cameras 100. In addition, when one of subjects identified on videos that are captured by cameras 100 at some instant is the same as the subject identified by the scene analysis, a correspondence between the same subjects is established by software or manually. Identification of the subject and establishment of correspondences between such subjects are performed along a time axis, by which the tracking is performed. There is however a case where a subject of interest in two-dimensional videos captured by cameras 100 becomes no longer identifiable because the subject is temporarily hidden behind another subject. Also in such a case, using three-dimensional model data provides three-dimensional position information or three-dimensional shape information on each subject, by means of which identification of the subject can be continued.

Such functions of the scene analysis and the tracking can be used, for example, in the next-generation monitoring system described above. It is expected this enables an early detection of a suspicious site and increases an accuracy of the detection. In addition, this allows security to be reinforced more than the former even in a location where a limited number of cameras can be installed.

All of the functions of the three-dimensional space recognition, the generation of a free-viewpoint video, the scene analysis, and the tracking, are assumed to be applied to both of after-the-fact use and real-time use. Each of the functions may be selected according to application purpose and implemented in a system including a computer having a performance appropriate to the selection, particularly that relating to video processing.

As seen from the above, in all of the functions of the three-dimensional space recognition, three-dimensional video data based on the three-dimensional model data is used. This three-dimensional model data is generated by three-dimensional space reconstruction (modeling) based on video data captured by cameras 100 and the camera parameters of cameras 100 calculated through the camera calibration.

The camera parameters include external parameters that indicate positions and attitudes of the cameras in the three-dimensional space and internal parameters that indicate optical properties of the cameras such as focal distance, aberration, and image center. From the camera parameters, a correlation between a point (u,v) on a two-dimensional video captured by a camera and a point (x,y,z) in a capturing area, which is a three-dimensional space shown in the two-dimensional video, is derived. That is, use of camera parameters of a camera enables projection of points on a two-dimensional video captured by the camera into a captured three-dimensional space. The projection into the three-dimensional space is the above three-dimensional space reconstruction ((d) of FIG. 1).

The camera parameters of the above plurality of cameras 100 are represented in a common three-dimensional coordinate system that is set in the capturing area. The camera parameters of cameras 100 are then calculated such that the same location (point) in capturing areas that are seen in videos captured by a plurality of cameras 100 is projected from the videos to the same point in this three-dimensional coordinate system ((b) of FIG. 1).

The camera parameters are necessary to generate three-dimensional model data from video data captured by cameras 100, and an accuracy of the camera parameters influences an accuracy of the three-dimensional space reconstruction. The term accuracy used here refers to an accuracy of camera parameters indicating a position of camera 100 in a three-dimensional space, that is, how close what the camera parameters indicate is to an actual state of camera 100. If the accuracy of the camera parameters is insufficient, the three-dimensional model data cannot be obtained.

As described with reference to FIG. 1, in a case where the camera calibration is performed immediately before the capturing, the accuracy of the camera parameters is sufficient immediately after the capturing is started but in general deteriorates with time due to vibrations occurring in an installation location of camera 100, operations performed on camera 100, or the like. The following description is given of a multiple viewpoint image capturing system that performs camera calibration on camera 100, camera parameters of which has deteriorated in accuracy, even during capturing at an appropriate time, so as to curb an adverse influence of the deterioration in the accuracy of the camera parameters on three-dimensional space reconstruction, intending in turn to stabilize an accuracy of and an availability of three-dimensional space recognition.

[2. Configuration of Multiple Viewpoint Image Capturing System]

Figure 2:
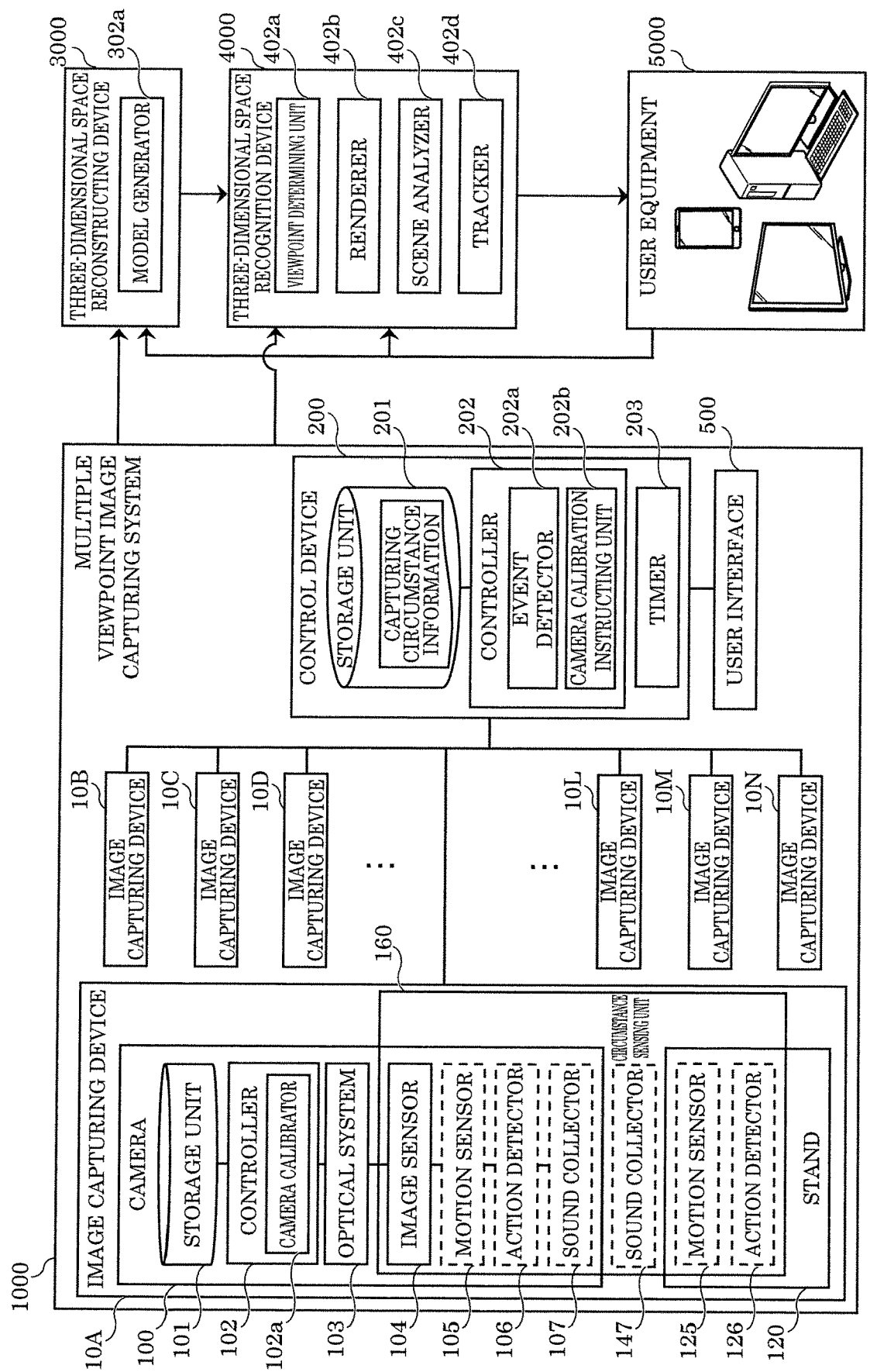
FIG. 2 is a block diagram illustrating a configuration of a multiple viewpoint image capturing system according to Embodiment 1.

FIG. 2 is a block diagram illustrating a configuration of a multiple viewpoint image capturing system according to an embodiment. The description is given also of a three-dimensional space reconstructing device and a three-dimensional space recognition device that use data received from the multiple viewpoint image capturing system, and a user equipment that receives a free-viewpoint video or the like from the three-dimensional space recognition device and displays the free-viewpoint video, with reference to FIG. 2.

Multiple viewpoint image capturing system 1000 according to an embodiment includes a plurality of image capturing devices 10A to 10N, control device 200, and user interface 500. Image capturing devices 10A to 10N are communicatively connected to control device 200.

[2-1. Configuration of Image Capturing Device]

The plurality of image capturing devices 10A to 10N are each devices that include camera 100, which is equivalent to each camera 100 illustrated in FIG. 1 for capturing a predetermined space, possible configurations of image capturing devices 10A to 10N are the same, and therefore description will be made about image capturing device 100A as an example. The term predetermined space used here is a sum set of capturing areas of the plurality of cameras 100.

Image capturing device 10A includes camera 100, stand 120, and circumstance sensing unit 160.

Camera 100 includes storage unit 101, controller 102, optical system 103, and image sensor 104.

Storage unit 101 stores a program that is read and executed by controller 102. Storage unit 101 temporarily stores video data on a capturing area captured with image sensor 104, meta information to be attached to the video data, such as a time stamp, information on what is sensed by circumstance sensing unit 160 described later, camera parameters of camera 100, and capturing settings such as a frame rate or a resolution being applied.

Such storage unit 101 is provided by use of a rewritable, nonvolatile semiconductor memory such as a flash memory. In addition, a read-only memory (ROM), which is non-rewritable, or a Random Access Memory (RAM), which is volatile, can be used as storage unit 101 according to whether data to be saved will be overwritten, how long the data has to be stored, or the like.

A number of image capturing devices included in multiple viewpoint image capturing system 1000 is not limited as long as the number is more than one. In addition, image capturing devices 10 need not have common properties. Image capturing devices 10 are not limited to monaural cameras and may include stereo cameras.

Controller 102 is provided by, for example, use of a central processing unit (CPU) and reads and executes the program stored in storage unit 101 described above to control constituent components included in camera 100, carrying out functions including capturing and the others. The other functions include the calculation of camera parameters, that is, the camera calibration. Camera calibrator 102a included in controller 102 is a functional constituent component that is implemented by controller 102 executing a program for the camera calibration.

In response to an operation of a user or when camera calibration information is input from control device 200 described later, camera calibrator 102a follows contents of the camera calibration information to perform the camera calibration. The camera calibration is performed in such a manner as to, for example, establish a correspondence between coordinates of a specific point (or a line or a surface including a plurality of points) in the three-dimensional space being the capturing area and a point (or a line or a surface including a plurality of points) on a two-dimensional video. The camera calibration is alternatively performed in such a manner as to establish a correspondence between specific points (or lines or surfaces including a plurality of points) on videos of a capturing area that is overlapped by at least a part of each of two-dimensional videos captured by image capturing devices 10A to 10N. Such establishment of the correspondences may be performed automatically by camera calibrator 102a that executes the program or may be performed manually by a user. The camera parameters calculated as a result of the camera calibration are transmitted to three-dimensional space reconstructing device 3000 as, for example, data to be used in the three-dimensional space reconstruction.

Optical system 103 is a constituent component by which light from the capturing area is formed into an image on image sensor 104, and is provided by use of optical elements including a lens. Optical system 103 may allow its focal distance and angle of view to be changed. A wide-angle lens or a super-wide-angle lens such as a fisheye lens may be used. For example, in a case where videos captured by multiple viewpoint image capturing system 1000 are used in a monitoring system, wide-angle lenses may be used to obtain a wide capturing area. Properties of optical system 103 that include focal distance, aberration, image center, and the like are used in the three-dimensional space reconstruction in a form of the internal parameters described above. That is, in a case where the focal distance of optical system 103 is changed, or a lens of optical system 103 is changed, it is necessary to change the camera parameters used in the three-dimensional space reconstruction as in the case where there is a change in a position of a camera. That is, the camera calibration is needed.

Image sensor 104 is provided in a form of a solid-state image sensor that receives light collected by optical system 103 with its light receiving surface and converts the received light into an electric signal representing an image, such as a CCD image sensor, a CMOS image sensor, and a MOS image sensor. Video data generated by image sensor 104 is transmitted to three-dimensional space reconstructing device 3000 and three-dimensional space recognition device 4000 for use in the three-dimensional space reconstruction and the three-dimensional space recognition.

Camera 100 illustrated in FIG. 2 further includes motion sensor 105, action detector 106, and sound collector 107. These will be described as constituent components of circumstance sensing unit 160 described later.

Stand 120 is a constituent component that fixes at a predetermined position and supports camera 100 generating video data to be used in the three-dimensional space reconstruction by capturing, and is provided in a form of, for example, a tripod. Stand 120 may allow a length or an angle of its leg to be adjusted in order to adjust a fixing position of camera 100 for preparation of the capturing. Stand 120 may include a mechanism to rotate its camera platform in order to pan or tilt camera 100, an elevating mechanism to move camera 100 vertically, and the like. Alternatively, stand 120 may include a mechanism to support and move camera 100, such as a dolly and a crane.

Stand 120 illustrated in FIG. 2 further includes motion sensor 125 and action detector 126. These will be described as constituent components of circumstance sensing unit 160 described below.

Circumstance sensing unit 160 senses at least circumstances of one of camera 100 (or image capturing device 10A) and a predetermined space including the capturing area of camera 100 and outputs the sensed circumstances in a form of capturing circumstance information. Put another way, circumstance sensing unit 160 is a sensor measuring an event occurring in at least one of camera 100 and the predetermined space, or a detector detecting the occurrence, and outputs a signal that indicates a result of the measurement or the detection. The output signal is transmitted to control device 200 and used for determination as to whether to perform the camera calibration performed in control device 200.

As circumstance sensing unit 160, a sensor or a detector included in camera 100 or stand 120 may be used as long as the sensor or the detector can sense the above circumstances, or separately from the sensor or the detector, another sensor or detector may be provided.

For example, image sensor 104 included in camera 100 may be used as circumstance sensing unit 160. In this case, control device 200 determines whether to perform the camera calibration based on video data output from image sensor 104. The determination is made based on, for example, changes over time in a background area seen video data, a number of feature points, or changes over time in whether a specific subject (e.g., person, ball, an exhibit to be monitored) is present or not.

Camera 100 in some cases includes a sensor that perceives displacement, acceleration, vibration, inclination, and geomagnetism or includes a positioning mechanism that can sense a larger parallel translation, such as a global positioning system (GPS) receiver. A sensor (motion sensor 105) that can sense such motions (movements) of camera 100 may be used as circumstance sensing unit 160.

In addition, camera 100 in some cases includes a mechanism that detects a manual action performed by a user or detects an action under control of controller 102 performing a program, that is, an automatic action. Examples of an action to be detected here include turning on-off of a switch, changing a setting of optical system 103 such as focal distance and focus. A sensor (action detector 106) that can sense such actions of camera 100 may be used as circumstance sensing unit 160.

Alternatively, stand 120 may include a sensor that perceives displacement, acceleration, vibration, inclination, and geomagnetism or may include a positioning mechanism such as a global positioning system (GPS) receiver. Since a motion of camera 100 is in synchronism with a motion of stand 120 on which camera 100 is fixed, it is possible to sense indirectly whether camera 100 moves or not based on, for example, whether stand 120 moves or not. A sensor (motion sensor 125) that can detect such a motion of camera 100 may be used as circumstance sensing unit 160.

Stand 120 in some cases includes a mechanism that detects an action caused by an operation performed by a user. An action detected here is, for example, an action of rotating or moving vertically the camera platform. A sensor (action detector 126) that can sense such actions of stand 120 may be used as circumstance sensing unit 160.

Stand 120 makes a mechanical motion when making an action; therefore, although motion sensor 125 and action detector 126 are distinguished from each other in the configuration illustrated in FIG. 2 for the convenience of description, they need not necessarily be distinguished in reality.

There is a case where camera 100 includes sound collector 107. Alternatively, sound collector 147 that is provided separately from camera 100 is in some cases used to collect sound of a scene captured by camera 100. Sound collected by sound collector 107 or sound collector 147 can indicate circumstances of camera 100 or the predetermined space including the capturing area of camera 100. Sound can indicate, for example, that camera 100 or stand 120 receives a shock, a scene to be highlighted occurs in a sporting event, or an intermission starts or ends. Sound collector 107 or 147 to collect such sound may be used as circumstance sensing unit 160.

As seen from the above, various kinds of sensors can be used as circumstance sensing unit 160 of multiple viewpoint image capturing system 1000 in the present embodiment. In FIG. 2, of the constituent components that can be used as circumstance sensing unit 160 in the above manner, image sensor 104 necessarily included in camera 100 is illustrated by a solid line, and the others are illustrated by broken lines.

Circumstance sensing unit 160 need not be arranged by both of sensors included in camera 100 and stand 120; it suffices that circumstance sensing unit 160 includes at least one of a sensor and a detector that senses at least one of the circumstances of camera 100 (or image capturing device 10A) and the predetermined space including the capturing area of camera 100, as exemplified above.

Image capturing devices 10B to 10N each includes camera 100, stand 120, and circumstance sensing unit 160 as with image capturing device 10A. The possible configurations of image capturing devices 10A to 10N are common as described above, but the configurations of image capturing devices 10A to 10N need not be common as long as video data generated by capturing and camera parameters are output from cameras 100 of image capturing devices 10A to 10N and input from multiple viewpoint image capturing system 1000 to three-dimensional space reconstructing device 3000. One image capturing device may include a plurality of cameras 100, and a number of optical systems and a number of image sensors included in camera 100 need not be one. For example, camera 100 may be a stereo camera.

[2-2. Configuration of Control Device and User Interface]

Control device 200 includes storage unit 201, controller 202, and timer 203.

Control device 200 controls image capturing devices 10A to 10N and processes data that is received from image capturing devices 10A to 10N. Control device 200 uses user interface 500 to present information relating to the control and the processing of data to a user and to receive input of instructions relating to the control and the processing of data from a user. An example of control device 200 is, for example, a computer. In this case, storage unit 201 is a storage device of this computer and is provided in a form of a hard disk drive, a semiconductor memory of any of various kinds, or combinations thereof. Controller 202 is provided in a form of a CPU of this computer, and timer 203 is a timer that is included in the computer and referred to by this CPU. User interface 500 is provided in a form of a display device, a touch screen, a track pad, a keyboard, a mouse, or other kinds of controllers, connected to this computer, or combinations thereof.

Storage unit 201 stores a program that is read and executed by controller 202. Storage unit 201 stores data that is received from image capturing devices 10A to 10N and to be processed by controller 202. The capturing circumstance information illustrated in FIG. 2 is an example of this data.

Controller 202 reads and executes a program that is stored in storage unit 201 described above, so as to control image capturing devices 10A to 10N described above, process data received from image capturing devices 10A to 10N, and perform a process for presenting information relating to the control and the processing to a user and a process for dealing with instructions from a user. These kinds of the processing include one that control capturing of a synchronized video by cameras 100 included in image capturing devices 10A to 10N. In addition, event detection is included as one of these kinds of the processing. Event detector 202a included in controller 202 is a functional constituent component that is implemented by controller 202 executing a program for event detection. Camera calibration instructing unit 202b included in controller 202 is a functional constituent component that is implemented by controller 202 executing a program for camera calibration instruction.

Event detector 202a detects occurrence of a predetermined event that can be a reason for performing the camera calibration on one of cameras 100 included in image capturing devices 10A to 10N, based on the capturing circumstance information that is provided from image capturing devices 10A to 10N. An event that can be a reason for performing the camera calibration is an event that causes camera 100 to move or has a high possibility of the movement, or an event that has a high possibility of enabling the camera calibration with high accuracy. More specific examples will be described later in description of action of multiple viewpoint image capturing system 1000. In a case of detecting the occurrence of such an event, event detector 202a determines whether to perform the camera calibration. In a case of determining to perform the camera calibration, event detector 202a outputs camera calibration information that indicates the camera calibration to be performed to, for example, camera calibration instructing unit 202b. Alternatively, the camera calibration information may be output to the display device included in user interface 500 to be presented to a user. The camera calibration information contains, for example, camera 100 on which the camera calibration is to be performed (or one of image capturing devices 10A to 10N including the camera) and details of the event that is the reason for performing the camera calibration.

Camera calibration instructing unit 202b causes camera 100 indicated by the camera calibration information to perform the camera calibration based on the camera calibration information received from event detector 202a. In a case where a number of cameras indicated by the camera calibration information is two or more, an order of cameras 100 to perform the camera calibration may be determined based on, for example, details of the event that is indicated by the camera calibration information and is the reason for performing the camera calibration. A specific example of processing performed by camera calibration instructing unit 202b will be described later.

Timer 203 is referred to by controller 202 for time keeping in the above processing.

[2-3. Configurations of Three-Dimensional Space Reconstructing Device and Three-Dimensional Space Recognition Device]

Three-dimensional space reconstructing device 3000 is provided by use of a computer and includes a storage device and a processing unit that are not illustrated. Model generator 302a illustrated in FIG. 2 is a functional constituent component that is implemented by this processing unit executing a program that is stored in the storage device and for generating three-dimensional model data (three-dimensional space reconstruction).

Model generator 302a performs reconstruction (modeling) of a three-dimensional shape of a subject based on video data and camera parameters that three-dimensional space reconstructing device 3000 receives from multiple viewpoint image capturing system 1000 and stores in the storage device. Data on a three-dimensional model generated by the three-dimensional model is stored in the storage device. In addition, the data is transmitted to three-dimensional space recognition device 4000.

Three-dimensional space recognition device 4000 is provided by use of a computer and includes a storage device and a processing unit that are not illustrated. Viewpoint determining unit 402a, renderer 402b, scene analyzer 402c, and tracker 402d illustrated in FIG. 2 are functional constituent components that are implemented by this processing unit executing a program that is stored in the storage device and for the three-dimensional space recognition. In some applications, three-dimensional space recognition device 4000 need not include some of these functional constituent components. For example, when the application of three-dimensional space recognition device 4000 is to generate a free-viewpoint video, three-dimensional space recognition device 4000 needs not include scene analyzer 402c and tracker 402d. When three-dimensional space recognition device 4000 is used as part of a monitoring system, the monitoring system is provided as one having a higher functionality by three-dimensional space recognition device 4000 including scene analyzer 402c and tracker 402d.

Viewpoint determining unit 402a determines a virtual viewpoint onto which a three-dimensional model provided from three-dimensional space reconstructing device 3000 is projected. In the determination, for example, when a video that is seen at a specific time point and from a specific viewpoint is requested from user equipment 5000, the specific viewpoint is determined as the virtual viewpoint onto which the three-dimensional model is projected. Alternatively, a viewpoint that is set in advance may be determined as the virtual viewpoint onto which the three-dimensional model is projected. The virtual viewpoint onto which the three-dimensional model is projected may be determined to be, for example, a viewpoint from which a face of a player near a goal is seen from the front in a case of a free-viewpoint video of a sporting event, or a viewpoint from which a face of a person near an entrance is seen from the front in a case of a video obtained by a monitoring device. The virtual viewpoint may alternatively be determined to be a new viewpoint in response to a request from scene analyzer 402c or tracker 402d described later. When the virtual viewpoint is determined, information indicating the determined virtual viewpoint (hereafter, referred to as virtual viewpoint information) is passed from viewpoint determining unit 402a to renderer 402b.

Renderer 402b uses the data on the three-dimensional model received from three-dimensional space reconstructing device 3000, the virtual viewpoint information received from viewpoint determining unit 402a, and the video data received from multiple viewpoint image capturing system 1000 to generate a free-viewpoint video. In generating the free-viewpoint video, the three-dimensional model is projected onto the virtual viewpoint indicated by the virtual viewpoint information. At this point, to determine a color and texture of a subject contained in the free-viewpoint video, information on a color and texture of each subject contained in a video data captured by an image capturing device that is close to the virtual viewpoint is preferentially used. The generated free-viewpoint video may be passed to scene analyzer 402c or may be distributed to user equipment 5000 to display the free-viewpoint video. The free-viewpoint video may be alternatively stored in the storage device included in three-dimensional space recognition device 4000 or an external storage device in a form of free-viewpoint video data.

Scene analyzer 402c analyzes data on the three-dimensional model received from three-dimensional space reconstructing device 3000 to, for example, identify a subject. A result of the analysis may be passed to tracker 402d or may be distributed together with the free-viewpoint video to user equipment 5000 to be displayed on user equipment 5000. The result may be alternatively stored in the storage device included in three-dimensional space recognition device 4000 or an external storage device in a form of data on the result of analyzing the free-viewpoint video. According to the result of the analysis, scene analyzer 402c may request determination of a virtual viewpoint that is seen at another time point or from another position from viewpoint determining unit 402a.

Tracker 402d tracks a specific subject based on the data on the three-dimensional model received from three-dimensional space reconstructing device 3000. A result of the tracking may be distributed together with the free-viewpoint video to user equipment 5000 to be displayed on user equipment 5000. In a case where, for example, the tracking of the specific subject is impossible, tracker 402d may request determination of a virtual viewpoint that is seen at another time point or from another position from viewpoint determining unit 402a.

User equipment 5000 is an apparatus that includes a communication unit and a display not illustrated, such as a television receiver, a personal computer, and a portable terminal. Via the communication unit, a free-viewpoint video received from three-dimensional space recognition device 4000 is displayed on the display of the user equipment.

User equipment 5000 may include an input device that is provided in a form of a touch screen, a track pad, a keyboard, a mouse, a microphone, other kinds of controllers, or combinations thereof. Using this input device, user equipment 5000 may accept input of a request relating to the three-dimensional space reconstruction or the three-dimensional space recognition from a user. For example, when input of a request for displaying a video that is seen at a specific time point from a specific viewpoint is accepted, this request is transmitted from the communication unit of user equipment 5000 to three-dimensional space recognition device 4000. For example, when a request for displaying a free-viewpoint video of a specific subject is accepted, this request may be transmitted from the communication unit of user equipment 5000 to three-dimensional space reconstructing device 3000 or three-dimensional space recognition device 4000. For example, when input of a request for specifying a specific subject to be tracked is accepted, this request may be transmitted to three-dimensional space recognition device 4000.

[2-4. Others]

The configuration of multiple viewpoint image capturing system 1000, the configurations of three-dimensional space reconstructing device 3000 and three-dimensional space recognition device 4000 that use video data and camera parameters received from multiple viewpoint image capturing system 1000, and the configuration of user equipment 5000 that receives a free-viewpoint video or the like from three-dimensional space recognition device 4000 and displays the free-viewpoint video or the like in the present embodiment are described above. These configurations are not limited to the above description.

For example, the above description is given about a case where camera calibrator 102a in each camera 100 performs the camera calibration according to the camera calibration information that is input from control device 200, but this does not limit what performs the camera calibration. For example, controller 202 of control device 200 may include a consolidating camera calibrator in multiple viewpoint image capturing system 1000. Camera calibrator of controller 202 may then acquire and use videos captured by a plurality of cameras 100 to perform the camera calibration according to the camera calibration information from camera calibration instructing unit 202b.

In the above configuration, each of control device 200, three-dimensional space reconstructing device 3000, and three-dimensional space recognition device 4000 is described such that the device is provided by use of a computer, but some or all of these devices may be combined to be implemented in one or more computers.

User interface 500 and user equipment 5000 may be the same apparatus. That is, similarly to user equipment 5000, user interface 500 may receive a video distributed from three-dimensional space recognition device 4000 and may display this video to a system administrator. This system administrator can input a request for controlling three-dimensional space reconstructing device 3000 and three-dimensional space recognition device 4000 according to this displayed video if the system administrator is an administrator of the multiple viewpoint image capturing system as well as an administrator of a free-viewpoint video distributing system or a monitoring system including three-dimensional space reconstructing device 3000 and three-dimensional space recognition device 4000.

[3. Action]

Next, action by multiple viewpoint image capturing system 100 in the present embodiment to achieve performing the camera calibration at an appropriate time will be described.

Figure 3:
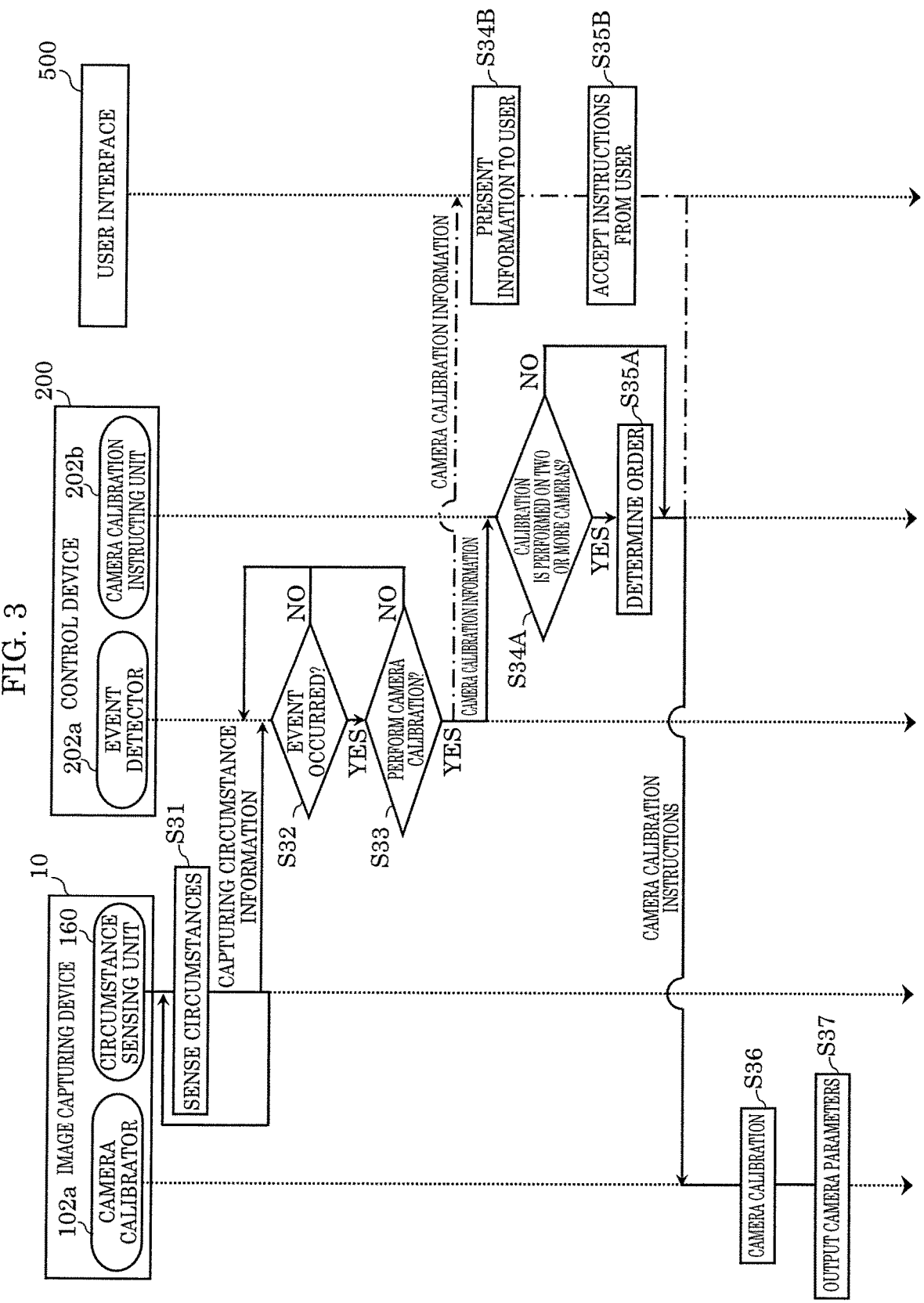
FIG. 3 is a sequence diagram illustrating a series of actions carried out by the multiple viewpoint image capturing system in Embodiment 1.

To perform the camera calibration at an appropriate time, multiple viewpoint image capturing system 1000 determines whether to perform the camera calibration when a change in an image capturing device or circumstances around the image capturing device (event) occurs. FIG. 3 is a sequence diagram used for describing a series of actions carried out by multiple viewpoint image capturing system 1000 in the present embodiment, including the determination as to whether to perform the camera calibration. In FIG. 3, image capturing device 10 represents any one of image capturing devices 10A to 10N illustrated in FIG. 2.

In image capturing device 10 during capturing, circumstance sensing unit 160 senses at least one of circumstances of camera 100 (or image capturing device 10) and circumstances of the predetermined space including the capturing area of camera 100, all the time or with a predetermined period (step S31). The sensed circumstances are output from circumstance sensing unit 160 in a form of capturing circumstance information and transmitted to control device 200.

In control device 200, based on the received capturing circumstance information, event detector 202a detects an occurrence of a predetermined event (step S32).

This predetermined event is an event that makes current camera parameters no longer able to indicate a position and the like of camera 100 accurately. Specifically, for example, an event that causes camera 100 to move or an event that has a high possibility of causing the movement are already described in the description about the configuration. Even in a case where camera 100 has not moved, an event that changes a capturing area or an event that has a high possibility of causing the change in the capturing area may be detected as the predetermined event.

Examples of the capturing circumstance information to be used to detect such events include information on video data output from image sensor 104, information indicating a position, inclination, and a vibration of camera 100 that is output from motion sensor 105 or 125. In a case of the video data, for example, a video is analyzed, by which whether camera 100 is changed in position or the like can be estimated based on a change occurring in an area that is estimated as a background area or a change occurring in a zone that the background area occupies in the video.

The capturing circumstance information may be information that is output from action detector 106 or 126 and indicates a predetermined action of camera 100 or stand 120. More specifically, the capturing circumstance information is information that indicates a change in a focal distance or exposure of camera 100, a switch of power ON-OFF of camera 100, a movement of a camera platform of stand 120, or the like. The capturing circumstance information may indicate these actions even when these actions are caused by a manual operation or automatic control of image capturing device 10.

The camera parameters in some cases do not reflect a state of a camera after the predetermined action correctly. For example, if the focal distance changes, internal parameters also change accordingly. There is a case where a user changes unintentionally a position or an attitude of camera 100 before or after a battery change in which camera 100 is once turned off. As another case, when camera 100 is moved while turned off, motion sensor 105 of camera 100 cannot sense this movement. Therefore, after camera 100 is turning on again, the camera parameters of camera 100 that have been used before camera 100 is turned off do not reflect the position and the attitude of camera 100 correctly. In addition, action of rotating or moving vertically the camera platform of stand 120 involves change in the position or the attitude of camera 100 (hereafter, referred to in some cases as action of camera 100, which also includes action of stand 120). As seen from the above, maintenance of an accuracy of camera parameters is intended by detecting a predetermined action that has a high possibility of involving change in a state of camera 100 and determining whether to perform the camera calibration based on this detection.

The capturing circumstance information may be information that is on sound around image capturing device 10 and output from sound collector 107 or 147.

Event detector 202a detects an occurrence of an event in a case where a change over time indicated by such capturing circumstance information exceeds a predetermined threshold value (YES in step S32). This predetermined threshold value is an example of a first threshold value in the present embodiment.

When detecting an occurrence of an event (YES in step 32), event detector 202a determines whether to perform camera calibration based on, for example, how large the change over time indicated by the information is (step S33). For example, the predetermined threshold value is determined in consideration of how large an influence of a case of continuing use of current camera parameters, on an accuracy of the three-dimensional space reconstruction, with respect to a size of movement of cameras 100 indicated by the capturing circumstance information. The determination as to whether to perform the camera calibration is made based on, for example, whether the change exceeds a predetermined threshold value that is larger than the first threshold value. This predetermined threshold value that is larger than the first threshold value is an example of a second threshold value in the present embodiment.

The predetermined event may be an event that is highly likely to enable the camera calibration with high accuracy. For example, camera calibration that is performed using a video including many feature points is likely to provide camera parameters with a higher accuracy (reliability).

Examples of capturing circumstance information used in detecting such an event also include information indicated by the video data output from image sensor 104 described above. For example, in a case where feature points are extracted by analyzing a video, and a total number of the extracted feature points is greater than or equal to a predetermined number, it may be determined that the predetermined event occurs (YES in step S32) and that the camera calibration is to be performed (YES in step S33).

The predetermined event may be alternatively an event that has less influence on convenience of a user. For example, being in a time period during which progress of a match stops in a sporting event, such as halftime, may be detected as an occurrence of the predetermined event. In a ball game, few users pay their attention to a place where neither ball nor person is present; therefore, being in a state where an entire capturing area includes neither ball nor person may be detected as an occurrence of the predetermined event. In a case of a monitoring system, being in a state where an entire capturing area and its surroundings include neither person nor automobile may be detected as an occurrence of the predetermined event.

Examples of the capturing circumstance information to be used to detect such events also include the information indicated by video data output from image sensor 104 described above and information that is on sound around image capturing device 10 and output from sound collector 107 or 147. In a case of video data, for example, in a case where analysis of a video shows that the video includes no image of a predetermined object such as a person, it may be determined that the predetermined event occurs (YES in step S32) and that the camera calibration is to be performed (YES in step S33). In a case of the information on sound, whether a game is in progress, whether a whistle is blown, whether a speaking voice or sound of footsteps of a person, or engine noise or running noise of an automobile is produced around image capturing device 10, or the like may be determined by analyzing the sound.

In addition, depending on a kind of an action performed on camera 100, it may be determined as occurrence of the predetermined event. This is because, for example, in a case where restarting camera 100, replacing a battery, or attaching or detaching a lens occurs, there is a high likelihood that the capturing area of camera 100 is changed. Such events are detected based also on information output from action detector 106. For example, a battery or a lens is replaced while camera 100 is turned off, and when capturing an image is thereafter started, an action of starting camera 100 occurs before the start. Hence, for example, in a case where event detector 202a receives information that indicates a detection of an action of the start, event detector 202a may determine that the predetermined event occurs. In subsequent step S33, the camera calibration may be determined to be performed as an indispensable action after the start or based on another piece of capturing circumstance information.

Event detector 202a may detect an occurrence of the predetermined event when a predetermined time elapses since last camera calibration of camera 100. For example, event detector 202a keeps a log of performing camera calibration in storage unit 201, refers to a time indicated by timer 203 included in control device 200 to calculate an elapsed time from the last camera calibration, and when the elapsed time exceeds a predetermined time, event detector 202a detects occurrence of the predetermined event.

This causes the camera calibration of camera 100 to be performed with a predetermined frequency or more often. For example, an occasion of updating the camera parameters is ensured in a case where changes that fall below the second threshold value that is used for determination as to whether to perform the camera calibration are accumulated in some camera 100, and camera parameters deviate from an actual state of camera 100 without performing the camera calibration.

When determining that the camera calibration is not to be performed (NO in step S33), event detector 202a returns to a receive-ready state for the capturing circumstance information.

When determining that the camera calibration is to be performed (YES in step S33), event detector 202a outputs the camera calibration information.

The camera calibration information contains information on camera 100 (or image capturing device 10 including camera 100) on which the camera calibration is to be performed and the reason for determining that the camera calibration is to be performed (the event described above). FIG. 4A and FIG. 4B each illustrate an example of a data configuration of the camera calibration information.

In the example illustrated in FIG. 4A, a target on which the camera calibration is to be performed is shown as image capturing device 10A, which includes camera 100 in question (see "10A" in the column "CALIBRATION TARGET"). In addition, the reason for performing the camera calibration is shown as "CAMERA PLATFORM ROTATED OR MOVED" in the column "REASON" together with a reason code of 20. Such camera calibration information is output in a case where the capturing circumstance information that event detector 202a receives from circumstance sensing unit 160 of image capturing device 10A indicates a rotation or a movement of the camera platform that exceeds the first threshold value and the second threshold value.

In the example illustrated in FIG. 4B, it is shown that cameras 100 included in all of image capturing devices 10 are to be subjected to the camera calibration (see "All" in the column "CALIBRATION TARGET"). In addition, the reason for performing the camera calibration is shown as "HALFTIME DETECTED" in the column "REASON" together with a reason code of 100. Such camera calibration information is output in a case where event detector 202a estimates that halftime of a sports match that is held in a predetermined space including a capturing area has started, based on the capturing circumstance information that event detector 202a receives from circumstance sensing unit 160 of one of image capturing devices 10. As described above, depending on details of a detected event, event detector 202a may determine that the camera calibration is to be performed on cameras 100 other than camera 100 included in image capturing device 10 from which the capturing circumstance information is transmitted.

The camera calibration information is input to camera calibration instructing unit 202b. Receiving the camera calibration information, camera calibration instructing unit 202b generates camera calibration instructions based on contents of the camera calibration information and transmits the generated camera calibration instructions to image capturing device 10 that includes an appropriate camera 100.

At this point, for example, in a case where a plurality of image capturing device 10 (or two or more cameras 100) are shown in the column "CALIBRATION TARGET" in the camera calibration information (YES in step S34A) or in a case where a plurality of pieces of camera calibration information with different contents in the column "CALIBRATION TARGET" are received in a certain period of time, camera calibration instructing unit 202b determines an order of cameras 100 to perform the camera calibration (step S35A). The camera calibration is then performed in the order determined by camera calibration instructing unit 202b. For this purpose, camera calibration instructing unit 202b may, for example, transmit the camera calibration instructions at different time points or may specify time points to perform in the camera calibration instructions.

This order may be determined based on, for example, the details of an event shown in the column "REASON" in the camera calibration information. The details of an event are, for example, a type of the event. For example, storage unit 201 stores a table in which priorities of performing the camera calibration are set in advance for each of types of events. Alternatively, a table in which priorities of performing the camera calibration are specified in advance to reason codes that event detector 202a attaches reasons as illustrated in FIG. 4A and FIG. 4B, may be stored in storage unit 201. When receiving a plurality of pieces of camera calibration information with different contents in the column "CALIBRATION TARGET", camera calibration instructing unit 202b may determine the order of camera 100 to perform the camera calibration by referring to this table or based on the reason code (step S35A). Such priority is given in such a manner that a higher priority is set to an event that is highly likely to cause a larger change in capturing area. Different priorities may be set also to the same kinds of events, for example, events of occurrence of vibration, depending on seriousness thereof.

Alternatively, the order may be specified in advance for each of kinds of events. For example, for an event is halftime, the order may be specified such that the camera calibration is performed on all cameras 100 at once. In this case, for example, camera calibration instructing unit 202b broadcasts the camera calibration instructions to image capturing devices 10A to 10N. Alternatively, to satisfy a demand for generating a free-viewpoint video also in halftime, the order may be specified that the camera calibration is performed on every group of several cameras 100 in turn according to disposition of cameras 100 in the predetermined space or that the camera calibration is started with a certain camera 100 and performed in turn. In this case, camera calibration instructing unit 202b determines an order of cameras 100 to perform the camera calibration according to the order specified in advance (step S35A).

This order may be determined based on, for example, the camera parameters of cameras 100 that are calculated by last camera calibration performed by camera calibrator 102a. For example, a capturing area of each camera 100 may be specified from the camera parameters of all cameras 100, and the order of cameras 100 to perform the camera calibration may be determined such that camera 100 including a capturing area of which a portion overlapping with capturing areas of other cameras 100 is small is preferentially calibrated. The order may be alternatively determined based on a target included in the capturing area such that, for example, camera 100 of which a capturing area is an area in front of a goal where a scene of a player releasing a shot can be captured is preferentially calibrated.

Note that "the order of cameras 100 to perform the camera calibration" described in the present embodiment also includes a case where the camera calibration is performed on a plurality of cameras 100 in parallel.

By camera calibration instructing unit 202b adjusting and determining the order of cameras 100 to perform the camera calibration in this manner, it is possible to perform the camera calibration on cameras 100 in an order that is suitable to maintain a state where the three-dimensional space reconstruction is properly performed or an order that influences the three-dimensional space reconstruction as less as possible.

The camera calibration information may be transmitted to user interface 500 to be presented to a user such as a system administrator (step S34B). Based on the information, the user inputs instructions to perform the camera calibration on camera(s) 100 being a target, using user interface 500 (ACCEPT INSTRUCTIONS in step S35B). The input instructions are transmitted to camera calibrator 102a via camera calibration instructing unit 202b. In this case, the order of cameras 100 to perform the camera calibration may be specified by the user or determined by camera calibration instructing unit 202b.

In camera 100 of image capturing device 10 that receives the camera calibration instructions, camera calibrator 102a performs the camera calibration (step S36). The camera parameters calculated by performing the camera calibration is output to three-dimensional space reconstructing device 3000 (step S37).

[4. Advantageous Effects]

As seen from the above, in the present embodiment, multiple viewpoint image capturing system 1000 includes a plurality of camera 100, circumstance sensing units 160, and event detector 202a.

The plurality of cameras 100 capture videos of areas that at least overlap one another in a predetermined space, from positions different from one another.

Circumstance sensing units 160 sense at least one of circumstances of respective cameras 100 and circumstances of the predetermined space described above, and outputs the sensed circumstances in a form of capturing circumstance information.

Based on this capturing circumstance information, event detector 202a detects occurrence of the predetermined event, and when detecting the occurrence of the predetermined event, event detector 202a determines whether to perform the camera calibration. In a case of determining to perform the camera calibration, event detector 202a outputs camera calibration information that indicates the camera calibration to be performed.

With this, it is determined whether performing the camera calibration is necessary or whether it is an appropriate timing to perform the camera calibration, based on statuses of cameras 100 in capturing or a status of a location where the capturing is performed (event). By providing information that indicates the camera calibration to be performed, it is possible to perform the camera calibration on an appropriate target at an appropriate timing. In addition, an occasion of update to make camera parameters reflective of actual positions and the like of cameras 100 is ensured also during capturing. By using the camera parameters that are updated in this manner, a state where the three-dimensional space reconstruction is properly performed is maintained, with a result that stabilities of an accuracy and an availability of the three-dimensional space recognition are enhanced.

Multiple viewpoint image capturing system 1000 may further include camera calibration instructing unit 202b that causes the plurality of cameras 100 to perform the camera calibration. The camera calibration information indicates camera(s) 100 on which the camera calibration is to be performed, of the plurality of cameras 100. The output camera calibration information is input to camera calibration instructing unit 202b, and camera calibration instructing unit 202b causes camera(s) 100 indicated by the camera calibration information to perform the camera calibration.

This enables the camera calibration based on the camera calibration information to be performed quickly on even camera 100, for example, lying at a position that a person cannot approach immediately. A state where the three-dimensional space reconstruction is properly performed is therefore maintained, with a result that stabilities of an accuracy and an availability of the three-dimensional space recognition are enhanced.

In addition, the camera calibration information may indicate details of the predetermined event, an occurrence of which is detected. In a case where the camera calibration information indicates that the camera calibration is to be performed on two or more cameras 100, camera calibration instructing unit 202b determines an order of cameras 100 to perform the camera calibration based on the details of the predetermined event indicated by the camera calibration information and causes the two or more cameras 100 to perform the camera calibration in the determined order.

In some circumstances of the predetermined space, there is a case where camera calibration with high accuracy can be performed quickly by performing the camera calibration on all cameras at once. By determining the order of cameras 100 to perform the camera calibration in this manner according to an event for which the camera calibration is performed, the camera calibration is performed on cameras 100 in an order that is appropriate for maintaining the state where the three-dimensional space reconstruction is performed properly. Note that "the order" also includes a case where the camera calibration is performed on the plurality of cameras 100 in parallel.

Circumstance sensing units 160 include image sensors 104 included in respective cameras 100, and the capturing circumstance information output by circumstance sensing units 160 may contain videos that is output by image sensors 104. In this case, event detector 202a extracts the feature points included in the videos, and when the total number of the extracted feature points is greater than or equal to the predetermined number, event detector 202a may detect the occurrence of the predetermined event and determine that the camera calibration is to be performed.

The camera calibration that is performed using videos including many feature points is likely to provide camera parameters with a higher accuracy (reliability). That is, such a time is an appropriate timing to perform the camera calibration. By using the camera parameters that are obtained by the camera calibration performing at this time, the three-dimensional space reconstruction is also performed with higher accuracy, and stabilities of an accuracy and an availability of the three-dimensional space recognition are enhanced.

Circumstance sensing units 160 include image sensors 104 included in respective cameras 100, and the capturing circumstance information output by circumstance sensing units 160 may contain videos that is output by image sensors 104. In this case, event detector 202a determines whether the videos include an image of a predetermined object, and in a case where no image of the predetermined object is included, the occurrence of the predetermined event may be detected, and it may be determined that the camera calibration is to be performed.

The predetermined object here indicates an importance of a scene captured by cameras 100 and refers to, for example, a person present in a monitoring zone, or a player or a ball in a ball game. Video data containing no image of such an object is less likely to be used to generate a free-viewpoint video; therefore, by setting camera 100 that generates the video data as a target of performing the camera calibration, stabilities of an accuracy and an availability of the three-dimensional space recognition for a user are enhanced.

Circumstance sensing units 160 may include at least one of image sensors 104 included in respective cameras 100, motion sensors 105 or 125 that sense changes in position and attitude of respective cameras 100, and sound collectors 107 or 147 that collect sound produced in the predetermined space. The capturing circumstance information output by circumstance sensing units 160 may be information output by at least one of image sensors 104, motion sensors 105 or 125, and sound collectors 107 or 147. In this case, event detector 202a may detect occurrence of the predetermined event in a case where the capturing circumstance information indicates a change that exceeds the first threshold value and may determine that the camera calibration is to be performed in a case where the capturing circumstance information indicates a change that exceeds the second threshold value larger than the first threshold value.

From a change in the information output from image sensors 104 or the like, it is possible to grasp a change that is likely to change the capturing areas of cameras 100, such as movements of cameras 100, and make the camera parameters unreflective of actual states of cameras 100. However, performing the camera calibration even in a case where a degree of this change is small reduces an available time of video data, which may rather have an adverse effect on the three-dimensional space reconstruction. Whether to perform the camera calibration is thus determined according to how large a change in circumstances of cameras 100 or circumstances of a predetermined space including the capturing area is. This causes the camera calibration to be performed in a case of a change that has an influence on performing the three-dimensional space reconstruction properly, whereas this causes the camera calibration not to be performed in a case where performing the camera calibration itself has a larger influence on the three-dimensional space reconstruction than the change in the circumstances. A state where the three-dimensional space reconstruction is properly performed is therefore maintained, with a result that stabilities of an accuracy and an availability of the three-dimensional space recognition are enhanced.

Circumstance sensing units 160 may include action detectors 126 that detect predetermined actions of respective cameras 100, and the capturing circumstance information output by circumstance sensing units 160 may be information on the predetermined actions occurring that are output from action detectors 126. In this case, event detector 202a may detect occurrence of the predetermined event based on the information on the predetermined actions occurring that is indicated as the capturing circumstance information.

This causes the camera parameters to be updated in accordance with the change in states of cameras 100 due to an action of cameras 100 or stands 120, by which a state where the three-dimensional space reconstruction is properly performed is maintained, with a result that stabilities of an accuracy and an availability of the three-dimensional space recognition are enhanced.

Event detector 202a may detect occurrence of the predetermined event when the predetermined time elapses since last camera calibration is performed, and may determine that the camera calibration is to be performed, for each of the plurality of cameras 100. This causes the camera calibration to be performed on each camera with the predetermined frequency or more often. For example, for a camera in which changes that fall below a threshold value that is used for determination as to whether to perform the camera calibration are accumulated, the camera calibration is performed and an occasion of updating the camera parameters is ensured.

Multiple viewpoint image capturing system 1000 may further include user interface 500 to present information to a user. The camera calibration information may be presented to a user via user interface 500.

This enables the user of multiple viewpoint image capturing system 1000 to learn, for example, which camera 100 is to be or is being subjected to the camera calibration. In addition, based on a reason for performing the camera calibration indicated by the presented camera calibration information (details of the predetermined event), a user may determine an order of performing the camera calibration on cameras 100 that are to be subjected to the camera calibration.

Embodiment 2

Hereafter, Embodiment 2 will be described with reference to FIG. 5 to FIG. 7. An outline of three-dimensional space recognition in which multiple viewpoint image capturing system in Embodiment 2 is used is the same as that of Embodiment 1, and therefore description of the outline will be omitted.

[1. Configuration of Multiple Viewpoint Image Capturing System]

Figure 5:
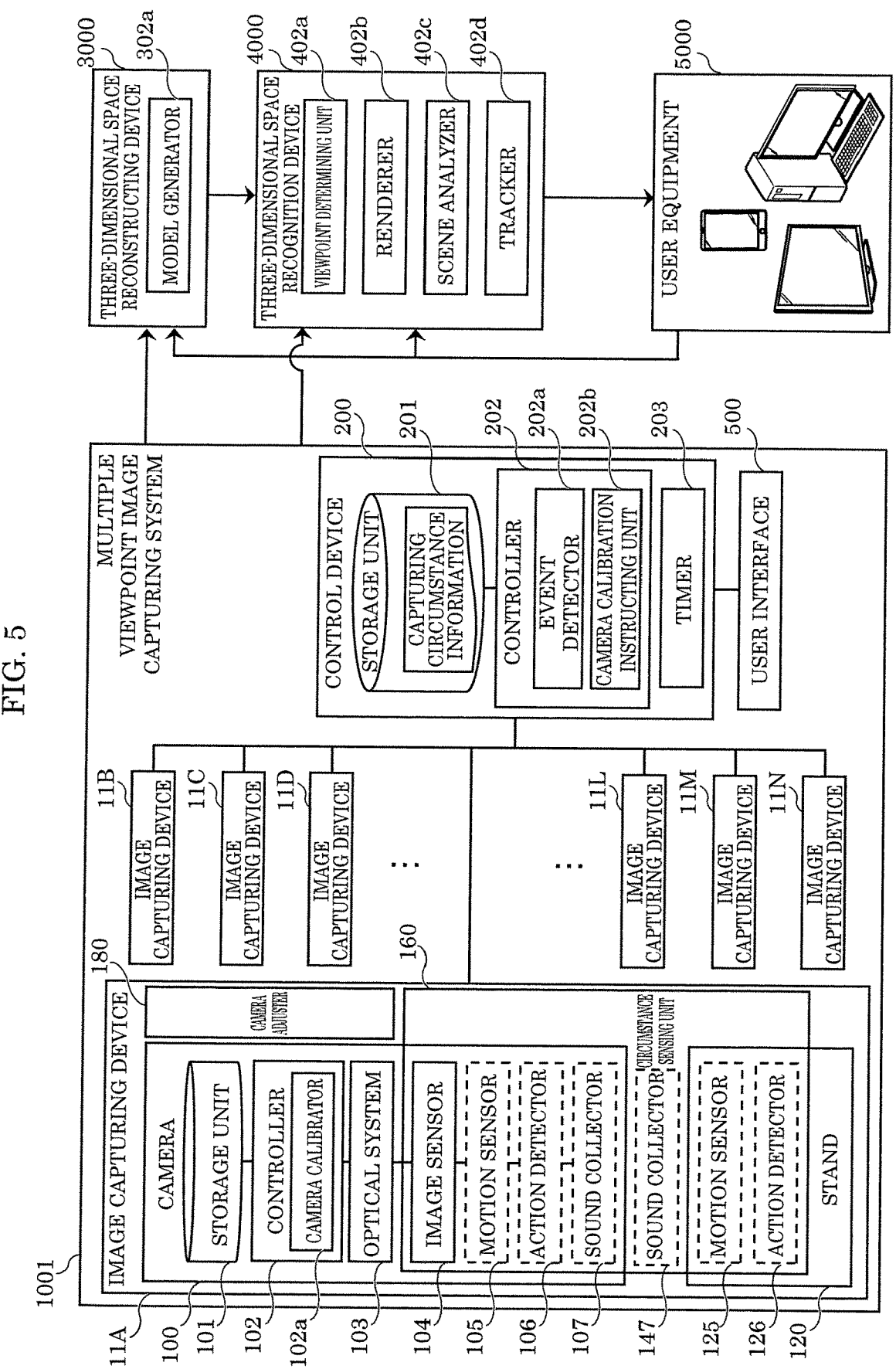
FIG. 5 is a block diagram illustrating a configuration of a multiple viewpoint image capturing system according to Embodiment 2.

FIG. 5 is a block diagram illustrating a configuration of a multiple viewpoint image capturing system according to an embodiment. A configuration of multiple viewpoint image capturing system 1001 in the present embodiment is the same as the configuration of multiple viewpoint image capturing system 1000 in Embodiment 1, except that image capturing device 11A includes camera adjuster 180. The description will be made below focusing on points of difference from Embodiment 1. The same constituent components as those of Embodiment 1 will be denoted by the same reference characters, and description thereof will be omitted.

Camera adjuster 180 performs adjustment of a capturing area of camera 100 in a case where a change in position or attitude of camera 100 is larger than or equal to a predetermined degree. If a change in the capturing area due to a change in position or the like of camera 100 is larger than a certain degree, an accuracy of the camera calibration deteriorates or the camera calibration cannot be performed, or a video of an intended area cannot be captured. In this case, camera adjuster 180 adjusts the capturing area such that the capturing area comes close to an original area so as to curb the deterioration of the accuracy of the camera calibration, to enable the camera calibration, or to enable the video of the intended area to be captured.

Such camera adjuster 180 is provided in a form of, for example, a microcomputer to move and fix a camera platform of stand 120 and a motor or the like that is controlled by this microcomputer. Camera adjuster 180 may be one that changes a focal distance of camera 100 so as to complement an adjustment that cannot be made by such mechanical movements or to make an adjustment that rather need not perform the mechanical movements. Such camera adjuster 180 is a functional constituent component that is implemented by controller 102 of camera 100 executing a program, although this is different from the illustration. In a case of camera adjuster 180 that is provided as a functional constituent component that changes a focal distance of camera 100, a change in capturing area due to a change in focal distance may be returned to its original, by which performing the camera calibration may be dispensed with.

[2. Action]

Next, action by multiple viewpoint image capturing system 1001 in the present embodiment to achieve performing the camera calibration including camera adjustment at an appropriate time will be described.

Figure 6:
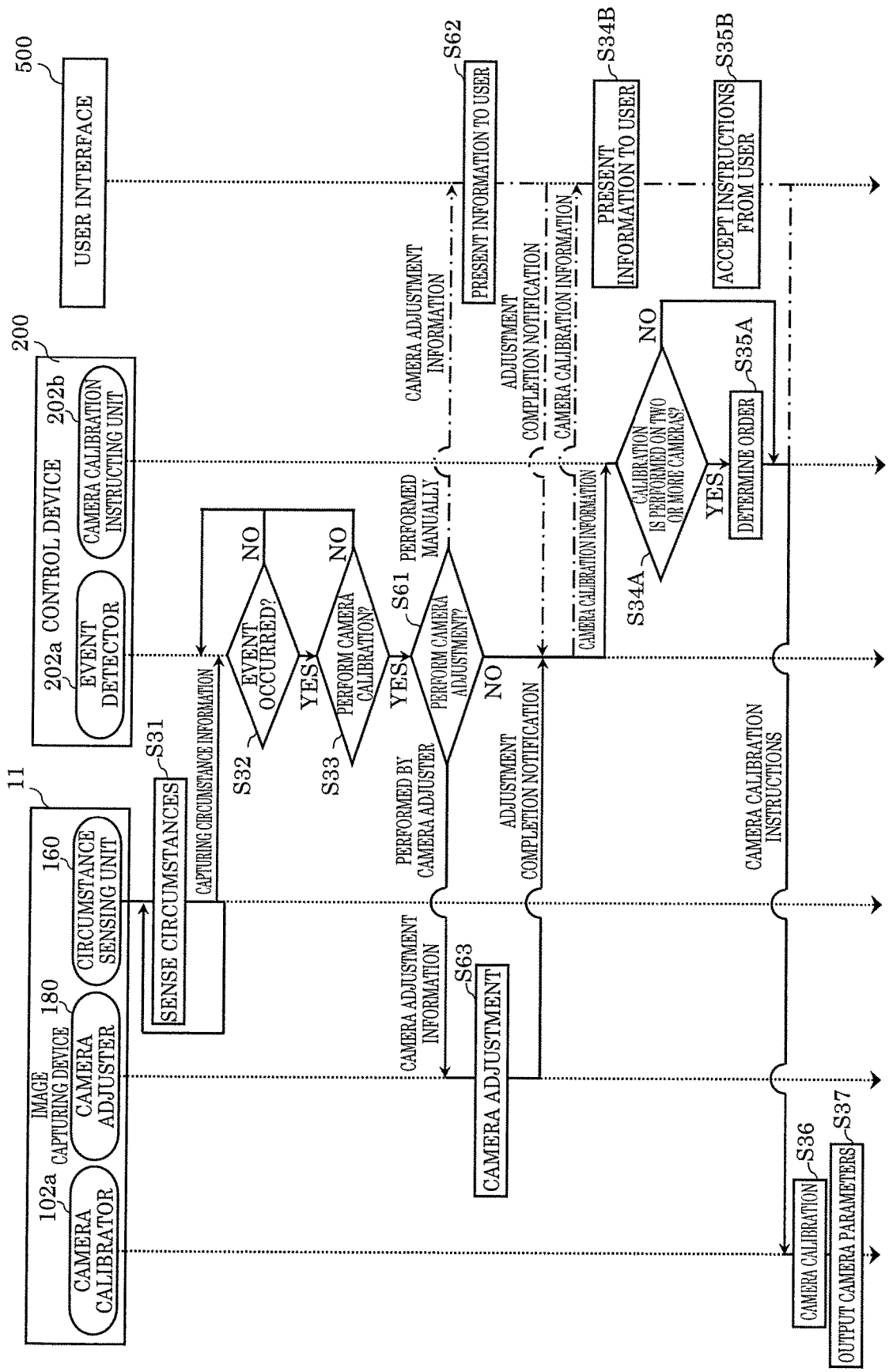
FIG. 6 is a sequence diagram illustrating a series of actions carried out by the multiple viewpoint image capturing system in Embodiment 2.

FIG. 6 is a sequence diagram used for describing a series of actions carried out by multiple viewpoint image capturing system 1001 in the present embodiment. In FIG. 6, image capturing device 11 represents any one of image capturing devices 11A to 11N illustrated in FIG. 5. The actions of multiple viewpoint image capturing system 1001 illustrated in FIG. 6 differ from the actions illustrated in FIG. 3 in that camera adjuster 180 is added and in that steps S61 to S63 relating to the camera adjustment are included. The description will be made below focusing on points of difference from Embodiment 1.

After determining whether to perform the camera calibration based on the capturing circumstance information in step S33, event detector 202a makes a determination as to performing the camera adjustment (step S61). The determination as to performing the camera adjustment includes, for example, determination as to whether to perform the camera adjustment and determination as to whether the camera adjustment is performed manually or by camera adjuster 180 in a case where the camera adjuster is to be performed.

The determination as to whether to perform the camera adjustment is performed based on capturing circumstance information, for example, motion information indicating at least one of a change in position of camera 100 and a change in attitude of camera 100 that are output by motion sensor 105 or motion sensor 125 included in circumstance sensing unit 160. For example, in a case where the motion information indicates a change that exceeds a predetermined threshold value of the position or the attitude of camera 100, event detector 202a determines that the camera adjustment is to be performed. This predetermined threshold value (hereafter, referred to as a third threshold value) is a value that is, for example, larger than the second threshold value, and a value that is large enough to contribute to determining whether the change is so large as to raise a problem in an accuracy of the camera calibration or a problem in performing the camera calibration. With this, since the change in position or the like indicated by the motion information exceeds the second threshold value in step S33, in a case where it is determined that the camera calibration is to be performed, it is determined in step S61 whether the change indicated by this motion information is so large as to raise a problem in an accuracy of the camera calibration or a problem in performing the camera calibration.

Information available as the above motion information is not limited to information output by motion sensor 105 or motion sensor 125. Other kinds of capturing circumstance information, that is, at least one of the video data output from image sensor 104 and information based on data on sound around image capturing device 10, that is output from sound collector 107 or 147 may be used as the motion information that indicates at least one of the change in position and the change in attitude of camera 100. In addition, combinations of these kinds of information may be used as the motion information. For example, a magnitude of motion (movement) of camera 100 is estimated in accordance with a magnitude of a change in video or sound indicated by these kinds of data, and the estimated magnitude of the motion may be compared with the third threshold value.

In the determination as to whether the camera adjustment is to be performed manually or by camera adjuster 180, it is determined that the camera adjustment is to be performed manually in a case where, for example, the above motion information indicates a change that exceeds a fourth threshold value larger than the third threshold value. The fourth threshold value is a value that is large enough to contribute to determining whether the change in position or the like occurring in camera 100 is so large that adjustment of the position or the like of camera 100 by camera adjuster 180 cannot ensure that the camera calibration can be performed, or cannot ensure an accuracy necessary for the camera calibration, or cannot ensure that an intended area can be captured. In this case, it is desirable to check circumstances of image capturing device 11 in question manually and to set the position of the camera again, and in order to urge a user to perform the checking and the setting, camera adjustment information is output to user interface 500.

Here, the camera adjustment information contains camera 100 (or image capturing device 11 including this camera 100), a capturing area of which is to be adjusted, and details of the adjustment. FIG. 7 illustrates an example of a data configuration of the camera adjustment information.

In the example illustrated in FIG. 7, a target of which a capturing area is to be adjusted is shown as image capturing device 11A that includes camera 100 in question ("11A" in the column "ADJUSTMENT TARGET"). Details of the adjustment are shown in a form of a rotation angle of a camera platform and a movement amount of an elevator. Note that this display form of the details of the adjustment is an example and is not limited to this. For example, the details of the adjustment may be shown in a form of movement distances in three-axis directions or may include an adjustment of a focal distance. Such details of the adjustment are determined based on the motion information being the capturing circumstance information.

User interface 500 that receives such camera adjustment information presents the camera adjustment information to a user (step S62).

In a case where it is determined in step S61 that the camera adjustment is to be performed by camera adjuster 180, the camera adjustment information is output to image capturing device 11 that includes camera 100 in question. In image capturing device 11, this camera adjustment information is input to camera adjuster 180, and camera adjuster 180 performs the camera adjustment based on this camera adjustment information (step S63).

When the camera adjustment is completed manually or by camera adjuster 180, a camera adjustment completion notification is transmitted to control device 200. Receiving the camera adjustment completion notification, control device 200 performs step S34A and its subsequent steps or step S34B and its subsequent steps, as in Embodiment 1.

Note that the determination as to whether to perform the camera adjustment (step S61) may be made also in multiple viewpoint image capturing system 1000 in Embodiment 1 that does not include camera adjuster 180. In this case, the camera adjustment is performed always manually; therefore, in a case where it is determined that the camera adjustment is to be performed, that is, the motion information exceeds the third threshold value, the camera adjustment information is output to user interface 500.

[3. Advantageous Effects, Etc.]

In multiple viewpoint image capturing system 1001 in the present embodiment, the capturing circumstance information may be motion information indicating at least one of changes in positions and changes in attitudes of the plurality of cameras 100 that are output by at least one of image sensors 104, motion sensors 105 and 125, and sound collectors 107 and 147. In this case, in a case where the motion information indicates a change that exceeds the third threshold value, event detector 202a may output camera adjustment information that indicates an adjustment of capturing areas that is performed on at least some of the plurality of cameras 100.

If a change in the capturing area of camera 100 exceeds a certain degree, an accuracy of the camera calibration deteriorates, performing the camera calibration becomes impossible, or a video of an intended area cannot be captured. Hence, by detecting a large change in position or the like of a camera based on the motion information, it is possible to take measures to bring the position or the like of cameras close to its original state before performing the camera calibration. This can curb the deterioration of the accuracy of the camera calibration, a likelihood of failing the camera calibration, and a likelihood of failing to capture a video of an intended area.

Multiple viewpoint image capturing system 1001 may further include camera adjuster 180 that performs camera adjustment for controlling at least some of capturing areas of the plurality of cameras 100. The output camera adjustment information is input to camera adjuster 180. Camera adjuster 180 may then perform the camera adjustment based on this camera adjustment information.

In this manner, it may be possible to bring the position or the like of camera 100 that is greatly changed close to its original position before performing the camera calibration without manual operation. This can curb the deterioration of the accuracy of the camera calibration, a likelihood of failing the camera calibration, and a likelihood of failing to capture a video of an intended area even for camera 100, for example, lying at a position that a person cannot approach immediately.

Multiple viewpoint image capturing system 1001 may further include user interface 500 to present information to a user. In a case where the motion information indicates a change that exceeds the fourth threshold value larger than the third threshold value, event detector 202a may present the camera adjustment information to the user using user interface 500.

In a case where a large change occurs in the position or the like of camera 100, there is a case where camera adjuster 180 cannot bring the position to its original state and needs manual operation. In this case, by presenting the camera adjustment information, it is possible to notify a user that the position or the like of camera 100 needs to be returned manually. This can curb the deterioration of the accuracy of the camera calibration, a likelihood of failing the camera calibration, and a likelihood of failing to capture a video of an intended area.

MODIFICATIONS

The multiple viewpoint image capturing systems in Embodiments 1 and 2 are described above, but the multiple viewpoint image capturing systems according to the present disclosure are not limited to these embodiments.

For example, although the pieces of the camera calibration information illustrated in FIG. 4A and FIG. 4B indicate priorities of performing the camera calibration indirectly, but information that indicates these priorities directly may be contained in the camera calibration information.

In the above description, the determination of the occurrence of an event (step S32) and the determination relating to performing the camera calibration (step S33) are made based on one piece of capturing circumstance information such as capturing circumstance information indicating vibrations of stand 120. However, these determinations may be made based on a plurality of pieces of capturing circumstance information. For example, points are specified in accordance with contents of each piece of capturing circumstance information, and these determinations may be made based on points accumulated since the last camera calibration. Alternatively, pieces of capturing circumstance information may be acquired with a certain period from various kinds of sensors included in circumstance sensing units 160, and these determinations may be made based on a total of points that are specified for contents of each piece of capturing circumstance information.

In the above description, the determination of the occurrence of an event (step S32) and the determination relating to performing the camera calibration (step S33) are made based on the capturing circumstance information that is transmitted from image capturing device 10 or 11. However, these determinations may be made based on another piece of information that is transmitted from a device other than image capturing device 10 or 11, or in response to a demand. For example, three-dimensional space reconstructing device 3000 or three-dimensional space recognition device 4000 may perform self-evaluations on results of processing performed by the devices, and information indicating the evaluations may be transmitted to control device 200 to be used as a material for determination of occurrence of an event or determination relating to performing the camera calibration. Alternatively, the determination relating to performing the camera calibration may be made in response to a demand for performing the camera calibration that a system administrator watching a free-viewpoint video makes using user interface 500.

In the above description, the camera calibration information and the camera adjustment information are transmitted from control device 200 to user interface 500 to be presented to a user, but information that can be presented to a user is not limited to these kinds of information. For example, in a case where the camera calibration is to be performed in image capturing device(s) 10 or 11 (step S36), information on image capturing device(s) 10 or 11 on which the camera calibration is to be or is being currently performed may be presented to a user via user interface 500, based on the camera calibration instructions. In addition, in a case where the camera adjustment is to be performed in image capturing device(s) 10 or 11 (step S63), information on image capturing device(s) 10 or 11 on which the camera adjustment is to be or is being currently performed may be presented to a user via user interface 500, based on the camera adjustment information. Furthermore, during performing the camera calibration or the camera adjustment, an area in a free-viewpoint video of which an image deteriorates in quality or an area for which a free-viewpoint video cannot be generated, due to an influence of performing the camera calibration or the camera adjustment, may be presented to a user via user interface 500. In a case where a position of a virtual viewpoint in a free-viewpoint video can be specified via user equipment 5000, information on the position may be displayed also on user equipment 5000. This enhances convenience of a user in using the free-viewpoint video.

Information on camera 100 (or image capturing device 10 or 11 including camera 100) performing the camera calibration or the camera adjustment may be provided to three-dimensional space reconstructing device 3000 and three-dimensional space recognition device 4000. Then, for example, three-dimensional space reconstructing device 3000 and three-dimensional space recognition device 4000 may exclude data on camera(s) 100 being subjected to the camera calibration or the camera adjustment from targets for use in the three-dimensional space reconstruction or the three-dimensional space recognition, or may assign a light weight to the data.

Three-dimensional space reconstructing device 3000 may be provided with, in addition to the video data and the camera parameters described above, a reliability of the camera parameters from multiple viewpoint image capturing system 1000 or 1001. Three-dimensional space reconstructing device 3000 stores the camera parameters that has been already received in the storage device together with this reliability, and refers to the reliability to select camera parameters to use. It is thereby possible for three-dimensional space reconstructing device 3000 to use preferentially camera parameters with high reliability for the three-dimensional space reconstruction even in a case where latest camera calibration cannot be performed appropriately due to some factors. For example, camera parameters with a predetermined reliability or higher may be used. Alternatively, camera parameters that are weighted in accordance with how high their reliability is may be used so that a result of the three-dimensional space reconstruction strongly reflects camera parameters with a high reliability.

In the above description, it is described that the larger the number of feature points included in a video is, the higher the reliability of obtained camera parameters is, but a factor in determining the reliability is not limited to this. Other factors in determining the reliability include, for example, error included in a result of the camera calibration (reprojection error) and an elapsed time from a time point at which the camera calibration is performed. This reliability may be calculated by camera calibrators 102a included in cameras 100. This reliability may be alternatively calculated based on capturing circumstance information that corresponds to camera parameters received by control device 200 from cameras 100. As seen from the above, techniques in the present disclosure may be embodied in a form of a three-dimensional space reconstructing system that includes multiple viewpoint image capturing system 1000 or 1001 and three-dimensional space reconstructing device 3000.

In addition, the reliability of the camera parameters may be provided to three-dimensional space recognition device 4000. In three-dimensional space recognition device 4000, for example, renderer 402b may refer to this reliability to determine image capturing device 10 or 11 that serves as a source of information on color and texture to be used to generate a free-viewpoint video. For example, in a case where a reliability of camera parameters obtained from image capturing device 10 that is closest to a virtual viewpoint is insufficient, renderer 402b may use information on color and texture of video data from image capturing device 10 that provides camera parameters with a high reliability, from between image capturing devices 10 on both sides of closest image capturing device 10, to generate a free-viewpoint video. In this case, renderer 402b may alternatively make color or texture of the free-viewpoint video unsharp or increase a playback speed so as to obscure unnaturalness seen in an image of a subject. As seen from the above, techniques in the present disclosure may be embodied in a form of a three-dimensional space recognition system that includes multiple viewpoint image capturing system 1000 or 1001 and three-dimensional space recognition device 4000.

By using the reliability of the camera parameters in this manner, accuracies of the three-dimensional space reconstruction and the three-dimensional space recognition are enhanced. In addition, a higher quality of free-viewpoint video or a free-viewpoint video in which defects are obscured is provided to a user.

In addition, a function assignment of event detector 202a and camera calibration instructing unit 202b in control device 200 in the embodiments is an example and not limited to the above description. For example, event detector 202a may detect occurrence of an event, and determination of performing the camera calibration and performing the camera adjustment may be made by controller 202 in control device 200.

Although the multiple viewpoint image capturing system according to one or a plurality of aspects of the present disclosure has been described on the basis of the embodiments, the multiple viewpoint image capturing system is not limited to the foregoing description. Modes obtained by modifying the embodiment in various ways that can be conceived those skilled in the art and modes obtained by combining components described in different embodiments may be included in the one or plurality of aspects of the present disclosure insofar as the scope of the present disclosure is not deviated from.

Embodiment 3

Other application examples of the configurations of the image processing method and apparatus described in each embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

FIG. 8 is a diagram illustrating a configuration of video information processing system ex100 according to the present embodiment. The present embodiment describes an example of preventing occurrence of a blind spot and an example of prohibiting capturing of a specific area.

Video information processing system ex100 illustrated in FIG. 8 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a blind spot from the video data stored in storage ex111, and transmits to the moving camera the instruction signal that indicates an instruction to the moving camera for preventing occurrence of a blind spot. The moving camera moves in response to the instruction signal, and continues capturing.

Analyzer ex112 detects a blind spot by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a blind spot an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a blind spot is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a blind spot by using any method that enables detection of the capturing area of each camera. Moreover, analyzer ex112 may acquire, for example, information of a mutual positional relationship between a plurality of objects to be captured, from video data or a proximity sensor, and analyzer ex112 may identify an area where a blind spot is highly likely to occur, based on the acquired positional relationship.

Here, the blind spot includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a blind spot even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a blind spot may be determined.

Note that detection of the area that is actually a blind spot is described above, but the area that needs to be detected in order to prevent occurrence of a blind spot is not limited to the area that is actually a blind spot. For example, when a plurality of objects to be captured exists and at least part of the objects is moving, a new blind spot is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new blind spot, based on the detected movement of the plurality of objects to be captured and positional information of camera ex102. In this case, video information processing apparatus ex101 may transmit the instruction signal to the moving camera to capture the area that is likely to become a blind spot, and video information processing apparatus ex101 may prevent occurrence of a blind spot.

Note that when there is a plurality of moving cameras, video information processing apparatus ex101 needs to select any of the moving cameras to which the instruction signal is to be transmitted in order to cause the moving camera to capture a blind spot or an area that is likely to become a blind spot. Moreover, when there is a plurality of moving cameras and there is a plurality of blind spots or areas that are likely to become blind spots, video information processing apparatus ex101 needs to determine which blind spot or area that is likely to become a blind spot each of the plurality of moving cameras is to capture. For example, video information processing apparatus ex101 selects the moving camera closest to a blind spot or an area that is likely to become a blind spot, based on a position of a blind spot or an area that is likely to become a blind spot, and a position of an area each moving camera is capturing. Moreover, video information processing apparatus ex101 may determine for each camera whether a new blind spot occurs when video data which the moving camera is currently capturing is not obtained, and video information processing apparatus ex101 may select the moving camera that is determined that a blind spot does not occur even when the video data which is currently being captured is not obtained.

The above-described configuration enables video information processing apparatus ex101 to prevent occurrence of a blind spot by detecting a blind spot and transmitting the instruction signal to the moving camera so as to prevent the blind spot.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the capturing area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current capturing area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing.

Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the capturing area is not limited thereto, but various methods for determining the capturing area described in each of the above-described embodiments or other methods for determining the capturing area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during the game, video information processing apparatus ex101 may distribute a scene which the user has missed and which is considered to be important, based on the analysis result made by analyzer ex112. Moreover, video information processing apparatus ex101 may distribute the past video when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 6. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge when the user views the advertisement, or may provide services at a lower cost than a cost in the case where the user does not view the advertisement.

Moreover, when the user clicks "Order now" or the like in response to the advertisement, a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras). In this case, analyzer ex112 matches the free viewpoint video with the video captured by the user camera, and accordingly analyzer ex112 determines which area in the facility or in the stadium the user camera is capturing. Note that the method for determining the capturing area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area based on the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video from the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, he user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the capturing area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a blind spot, some area of the capturing areas in the captured video data is likely to be needed for filling the blind spot. In this case, camera ex102 may generate extracted video data by extracting at least the area needed for preventing occurrence of the blind spot from the video data, and transmit the generated extracted video data to video information processing apparatus ex101. This configuration can realize suppression of occurrence of the blind spot at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the capturing area from more cameras ex102, video information processing apparatus ex101 is effective, for example, for using information of the capturing area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present embodiment is effective.

Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the external appearance video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may restore the three-dimensional shapes of persons and moving objects or preferentially restore the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex11. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using high-quality data, or by preferentially using high-quality data among the plurality of pieces of video data stored in storage ex111.

Variation 14

Analyzer ex112 may restore the three-dimensional shape by using camera attribute information. For example, analyzer ex112 may generate the three-dimensional shape video by a method such as a volume intersection technique or a multi-view stereo method by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Moreover, the positional and angle information of camera ex102 is acquired by pointing camera ex102 at a specific point in the facility or in the stadium when camera ex102 is activated or at any timing. FIG. 9 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the capturing area during a capturing period by using an arrow or the like may be used.

The coordinates of camera ex102 may be identified by using a radio wave of the global positioning system (GPS), wireless fidelity (WiFi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera, weather and a road surface state in a direction of a destination, traffic congestion level and the like can be understood with better accuracy by using three-dimensional data modeled from a plurality of images.

Variation 17

The above-described system may also be applied to a system that performs distance measurement or modeling of a building or equipment by using a plurality of cameras, for example.

Here, for example, in a case of capturing an image of a building from above using one drone, and performing distance measurement or modeling of the building, there is a problem in that an image of an animal may be captured by the camera during distance measurement, thereby reducing the accuracy of distance measurement. There is also a problem in that distance measurement and modeling cannot be performed with respect to an animal.

Meanwhile, by using a plurality of cameras (fixed cameras, smartphones, wearable cameras, drones, etc.) as described above, distance measurement and modeling of a building may be performed with stable accuracy regardless of presence or absence of an animal. Also, distance measurement and modeling may be performed with respect to an animal.

Specifically, for example, at a construction site, a camera is attached to a helmet or the like of a worker. This allows distance measurement of the building to be performed in parallel to the work of the worker. Also, efficiency of work may be increased, and mistakes may be prevented. Furthermore, modeling of the building may be performed by using a video captured by the camera worn by the worker. Moreover, a manager at a remote location may check the progress by looking at a modeled building.

Moreover, this system may be used for inspection of equipment that cannot be stopped, such as a machine at a factory or a power station. Also, this system can be used to inspect opening/closing of a bridge or a dam, or to inspect an abnormality in the operation of a ride in an amusement park, for example.

Moreover, by monitoring the level of traffic jam or the amount of traffic on a road by this system, a map indicating the level of traffic jam or the amount of traffic on the road in each time zone may be created.

Embodiment 4

The processing described in each of the above-described embodiments can be carried out easily in a standalone computer system by recording a program for implementing the configuration of the image processing method described in each embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the embodiments and the systems using the application examples will be further described. The systems include an apparatus that uses the image processing method. A change in other configurations of the systems can be made appropriately in accordance with the circumstances.

Figure 10:
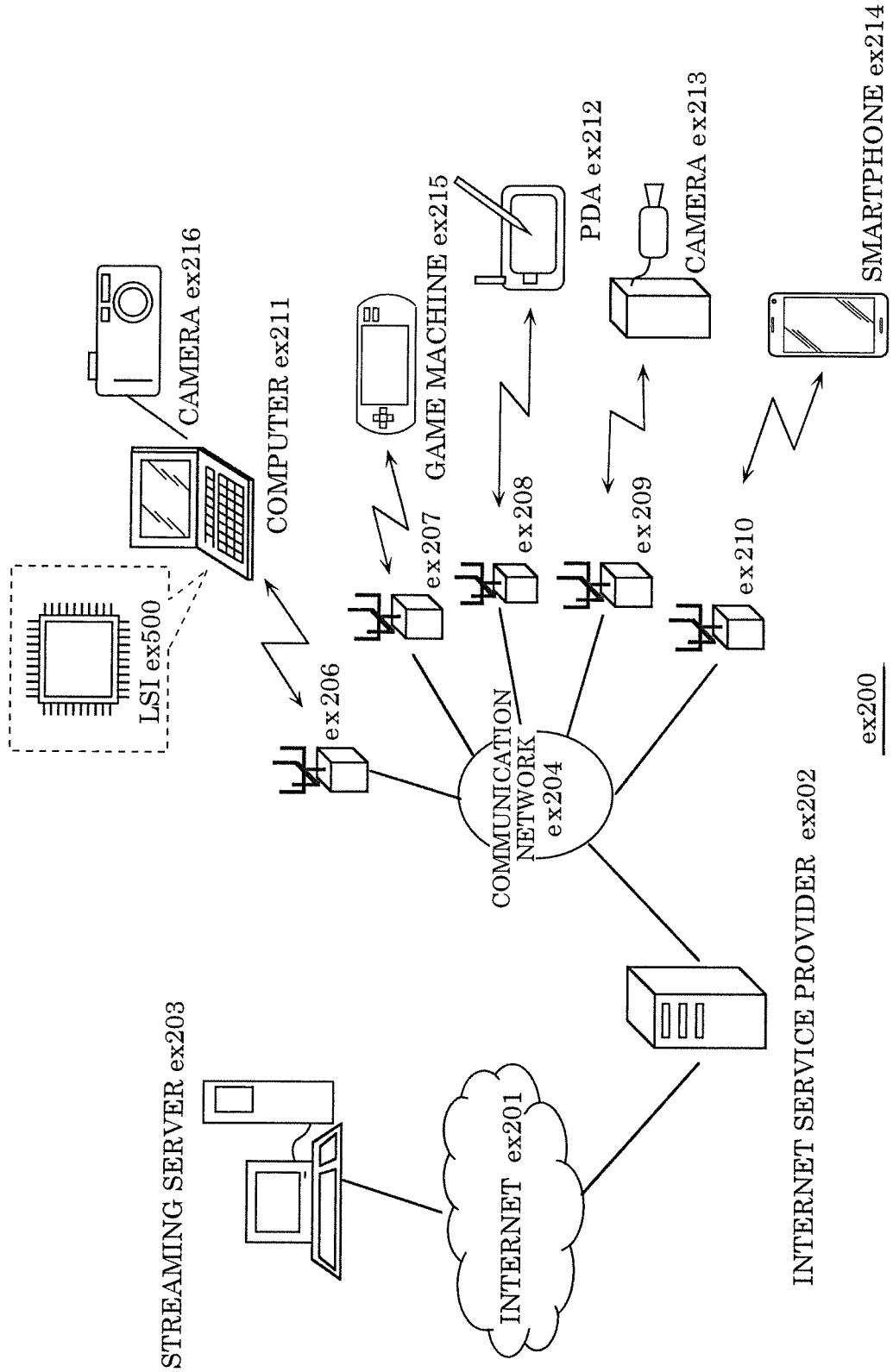
FIG. 10 is a general configuration diagram of a content provision system that implements content distribution services.

FIG. 10 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 10, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handyphone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may include a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 11:
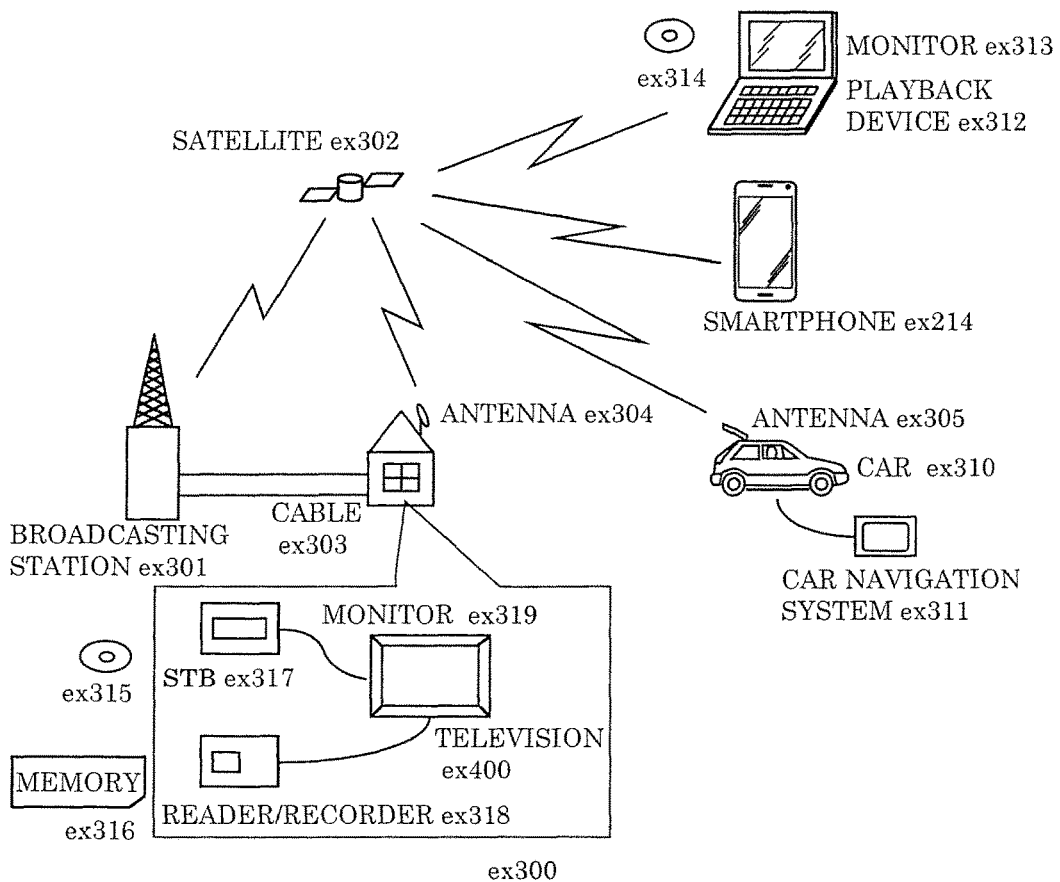
FIG. 11 is a general configuration diagram of a digital broadcasting system.

Note that in addition to the example of content providing system ex200, each of the above-described embodiments may also be applied to digital broadcasting system ex300, as illustrated in FIG. 11. Specifically, broadcasting station ex301 transmits multiplexed data obtained by multiplexing video data with music data or the like via a radio wave to communication or satellite ex302. This video data is data coded by the moving image coding method described in each of the above-described embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 12:
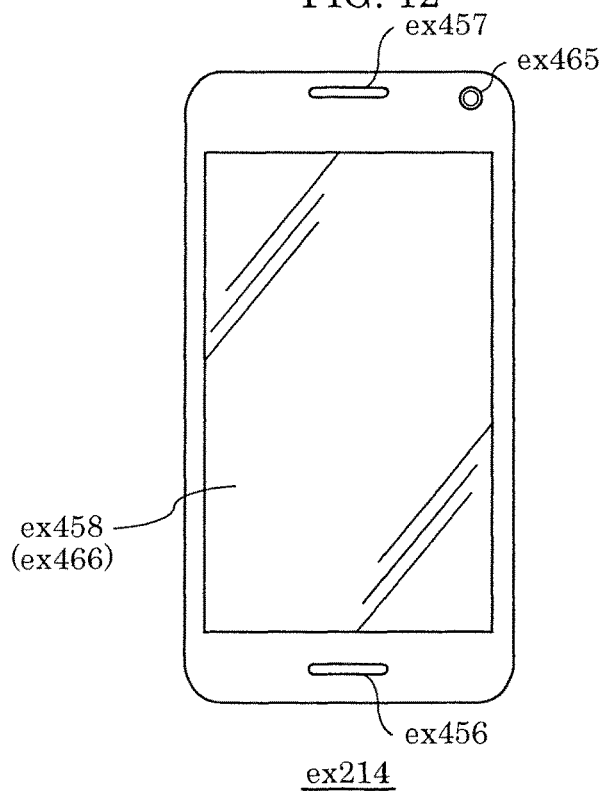
FIG. 12 is a diagram illustrating an example of a smartphone.
Figure 13:
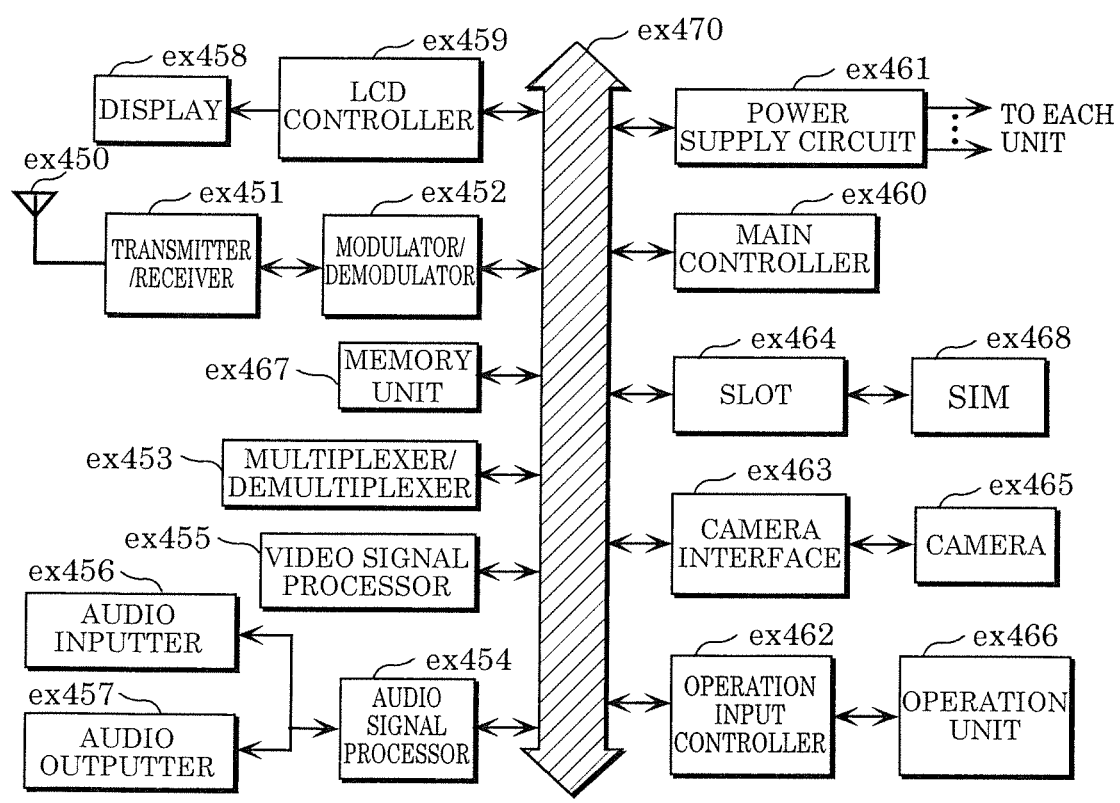
FIG. 13 is a block diagram illustrating a configuration example of a smartphone.

FIG. 12 is a diagram illustrating smartphone ex214. Moreover, FIG. 13 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 11, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including only an encoder, and a reception terminal including only a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

The present disclosure is not limited to such embodiments described above, and various variations and modifications may be made without departing from the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a multiple viewpoint image capturing system that includes a plurality of image capturing devices for capturing videos of the same scene, used for three-dimensional space reconstruction, from multiple viewpoints.

What is claimed is:

1. A multiple viewpoint image capturing system, comprising:
    a plurality of cameras that capture videos in a predetermined space from different positions;
    a non-transitory memory storing one or more programs; and
    a controller configured to execute the one or more programs to operate as:
    a circumstance sensing unit that senses at least one of circumstances of the respective cameras and circumstances of the predetermined space, and outputs the circumstances sensed, in a form of capturing circumstance information;
    an event detector that detects occurrence of a predetermined event based on the capturing circumstance information, determines whether to perform camera calibration in a case of detecting the occurrence of the predetermined event, and outputs camera calibration information that indicates the camera calibration to be performed in a case of determining that the camera calibration is to be performed; and
    a camera calibration instructing unit that causes the plurality of cameras to perform the camera calibration,
    wherein the camera calibration information indicates a camera on which the camera calibration is to be performed, among the plurality of cameras,
    the camera calibration information that is output is input to the camera calibration instructing unit,
    the camera calibration instructing unit causes the camera indicated by the camera calibration information to perform the camera calibration, and
    in a case where the camera calibration information indicates that the camera calibration is to be performed on two or more cameras, the camera calibration instructing unit determines an order of cameras to perform the camera calibration based on the details of the predetermined event and causes the two or more cameras on which the camera calibration is to be performed to perform the camera calibration, in the order determined, so that camera calibration of a first camera is performed prior to camera calibration of a second camera according to the order determined, the first camera and the second camera being included in the plurality of cameras.

2. The multiple viewpoint image capturing system according to claim 1, wherein
    the camera calibration information further indicates details of the predetermined event, occurrence of which is detected.

3. The multiple viewpoint image capturing system according to claim 1, wherein
    the circumstance sensing unit includes image sensors that are included in the respective cameras,
    the capturing circumstance information contains videos that are output by the image sensors, and
    the event detector extracts feature points included in the videos, and in a case where a total number of the extracted feature points is greater than or equal to a predetermined number, the event detector detects the occurrence of the predetermined event and further determines that the camera calibration is to be performed.

4. The multiple viewpoint image capturing system according to claim 1, wherein
    the circumstance sensing unit includes image sensors that are included in the respective cameras,
    the capturing circumstance information includes videos that are output by the image sensors, and
    the event detector determines whether the videos include an image of a predetermined object, and in a case where no image of the predetermined object is included in the videos, the event detector detects the occurrence of the predetermined event and further determines that the camera calibration is to be performed.

5. The multiple viewpoint image capturing system according to claim 1, wherein
    the circumstance sensing unit includes at least one of:
        image sensors that are included in the respective cameras;
        motion sensors that sense changes in positions and attitudes of the respective cameras; and
        a sound collector that collects sound in the predetermined space, wherein
    the capturing circumstance information is information that is output by at least one of the image sensors, the motion sensors, and the sound collector, and
    the event detector detects the occurrence of the predetermined event in a case where the capturing circumstance information indicates a change that exceeds a first threshold value, and determines that camera calibration is to be performed in a case where the capturing circumstance information indicates a change that exceeds a second threshold value larger than the first threshold value.

6. The multiple viewpoint image capturing system according to claim 5, wherein
    the capturing circumstance information is motion information indicating at least one of changes in positions and attitudes of the plurality of cameras that are output by at least one of the image sensors, the motion sensors, and the sound collector, and in a case where the motion information indicates a change that exceeds a third threshold value, the event detector outputs camera adjustment information that indicates an adjustment of capturing areas that is performed on at least some of the plurality of cameras.

7. The multiple viewpoint image capturing system according to claim 6, further comprising
a camera adjuster that performs camera adjustment for controlling capturing areas of at least some of the plurality of cameras, wherein
the output camera adjustment information is input to the camera adjuster, and
the camera adjuster performs the camera adjustment based on the camera adjustment information that is input.

8. The multiple viewpoint image capturing system according to claim 7, further comprising
a user interface for presenting information to a user, wherein
in a case where the motion information indicates a change that exceeds a fourth threshold value larger than the third threshold value, the event detector presents the camera adjustment information to a user via the user interface.

9. The multiple viewpoint image capturing system according to claim 1, wherein
the circumstance sensing unit includes action detectors that detect predetermined actions of the respective cameras, wherein
the capturing circumstance information is information on the predetermined actions occurring that is output by the action detectors, and
the event detector detects the occurrence of the predetermined event based on the information on the predetermined actions occurring that is indicated as the capturing circumstance information.

10. The multiple viewpoint image capturing system according to claim 1, wherein
the event detector detects, for each of the plurality of cameras, the occurrence of the predetermined event when a predetermined time elapses since last camera calibration is performed, and further determines that the camera calibration is to be performed.

11. The multiple viewpoint image capturing system according to claim 1, further comprising
a user interface for presenting information to a user, wherein
the camera calibration information is presented to the user via the user interface.

12. A three-dimensional space reconstructing system, comprising:
the multiple viewpoint image capturing system according to claim 1; and
a three-dimensional space reconstructing device that uses a plurality of video data items captured by the plurality of cameras, camera parameters of the plurality of cameras, and a reliability of the camera parameters to generate a three-dimensional model data on a subject in the predetermined space.

13. The three-dimensional space reconstructing system according to claim 12, wherein
the three-dimensional space reconstructing device uses, among the camera parameters, a camera parameter that is higher in the reliability more preferentially than a camera parameter that is lower in the reliability, for reconstruction of a three-dimensional shape of the subject in the predetermined space.

14. A three-dimensional space recognition system, comprising:
the multiple viewpoint image capturing system according to claim 1;
a three-dimensional space reconstructing device that reconstructs a three-dimensional shape of a subject in the predetermined space using a plurality of video data items captured by the plurality of cameras, the camera parameters of the plurality of cameras, and the reliability of the camera parameters to generate three-dimensional model data; and
a three-dimensional space recognition device that uses the three-dimensional model data to generate a free-viewpoint video and transmits the free-viewpoint video generated to a user equipment including a display.

15. The three-dimensional space recognition system according to claim 14, wherein
based on the camera calibration information, the user equipment is caused to display information indicating a camera, among the plurality of cameras, on which the camera calibration is to be or is being performed.

16. The multiple viewpoint image capturing system according to claim 1, wherein
the order determined by the camera calibration instructing unit includes setting a priority higher for a camera having a higher possibility that a capturing area has changed.

17. The multiple viewpoint image capturing system according to claim 1, wherein
the order determined by the camera calibration instructing unit includes setting a priority higher for a camera having a capturing area that overlaps less with a capturing area of another camera.

18. A calibrator for cameras, comprising:
communication interface circuitry to be connected to the cameras and to at least one sensor provided for the cameras; and
processing circuitry configured to:
control the communication interface circuitry to receive, from the at least one sensor, sensed information;
calculate order of recalibration processes of the respective cameras based on the sensed information; and
control the communication interface circuitry to send instructions such that the recalibration processes are sequentially performed in the order,
wherein the cameras include a first camera and a second camera, and
wherein the order is calculated such that the recalibration process of the first camera is performed prior to the recalibration process of the second camera.

19. The calibrator according to claim 18,
wherein the at least one sensor includes action sensors provided for the respective cameras, and
wherein each action sensor is configured to detect at least one of: power-on of a corresponding camera; a focal length of the corresponding camera; or an action to change an optical parameter of the corresponding camera.

20. The calibrator according to claim 18,
wherein the cameras include a first camera and a second camera to shoot a first area and a second area, respectively, wherein a first possibility of change in the first area is higher than a second possibility of change in the second area, and wherein the order is calculated such that the recalibration of the first camera is performed prior to the recalibration of the second camera.

21. A calibrator for cameras, comprising:

communication interface circuitry to be connected to the cameras and to at least one sensor provided for the cameras; and processing circuitry configured to:
- control the communication interface circuitry to receive, from the at least one sensor, sensed information;
- calculate order of recalibration processes of the respective cameras based on the sensed information; and
- control the communication interface circuitry to send instructions such that the recalibration processes are sequentially performed in the order, wherein the cameras include a first camera and a second camera to shoot a first area and a second area, respectively, the first area has a first overlapped area that is overlapped with at least one other area shot by at least one other camera other than the first camera, wherein the second area has a second overlapped area that is overlapped with at least one other area shot by at least one other camera other than the second camera, and wherein the order is calculated such that the recalibration of the first camera is performed prior to the recalibration of the second camera.

22. A calibration method, performed by a calibrator, for calibrating cameras, the calibration method comprising:

controlling, by processing circuitry of the calibrator, communication interface circuitry of the calibrator to receive, from at least one sensor, sensed information, the at least one sensor being provided for the cameras;

calculating, by the processing circuitry, order of recalibration processes of the respective cameras based on the sensed information; and controlling, by the processing circuitry, the communication interface circuitry to send instructions to the respective cameras such that the recalibration processes are sequentially performed in the order, wherein the cameras include a first camera and a second camera, and wherein the order is calculated such that the recalibration process of the first camera is performed prior to the recalibration process of the second camera.

* * * * *